US012625383B2

(12) United States Patent
Shi

(10) Patent No.: US 12,625,383 B2
(45) Date of Patent: May 12, 2026

(54) OPTICAL MODULE AND HEAD MOUNTED DISPLAY

(71) Applicant: Goertek Optical Technology Co., Ltd., Weifang (CN)

(72) Inventor: Chaiyuan Shi, Shandong (CN)

(73) Assignee: Goertek Optical Technology Co., Ltd., Weifang (CN)

( * ) Notice: Subject to any disclaimer, the term of this patent is extended or adjusted under 35 U.S.C. 154(b) by 17 days.

(21) Appl. No.: 18/867,087

(22) PCT Filed: Jun. 27, 2022

(86) PCT No.: PCT/CN2022/101436
§ 371 (c)(1),
(2) Date: Nov. 19, 2024

(87) PCT Pub. No.: WO2023/221238
PCT Pub. Date: Nov. 23, 2023

(65) Prior Publication Data
US 2025/0306388 A1 Oct. 2, 2025

(30) Foreign Application Priority Data

May 19, 2022 (CN) .......................... 202210560045.9

(51) Int. Cl.
| G02B 27/09 | (2006.01) |
| G02B 5/30 | (2006.01) |
| G02B 27/01 | (2006.01) |
| G02B 27/12 | (2006.01) |
| G02B 27/28 | (2006.01) |

(52) U.S. Cl.
CPC ....... *G02B 27/0955* (2013.01); *G02B 5/3083* (2013.01); *G02B 27/0172* (2013.01); *G02B 27/123* (2013.01); *G02B 27/286* (2013.01)

(58) Field of Classification Search
CPC .............. G02B 27/0955; G02B 5/3083; G02B 27/0172; G02B 27/123; G02B 27/286
See application file for complete search history.

(56) References Cited

U.S. PATENT DOCUMENTS

| 10,073,249 | B2 * | 9/2018 | Huang | ............... | G02B 13/0045 |
| 10,175,493 | B1 * | 1/2019 | Chen | .................. | G02B 27/0955 |
| 12,038,564 | B2 * | 7/2024 | Zhu | .......................... | G02B 9/62 |
| 2016/0316180 | A1 * | 10/2016 | Han | .................. | G02B 13/0035 |

(Continued)

FOREIGN PATENT DOCUMENTS

| CN | 108713159 | A | * | 10/2018 | ........... | G02B 6/0008 |
| CN | 114280783 | A | * | 4/2022 | | |
| CN | 114415355 | B | * | 8/2022 | ......... | G02B 13/0045 |

*Primary Examiner* — Ibrahim A Khan
(74) *Attorney, Agent, or Firm* — Baker Botts LLP

(57) ABSTRACT

Embodiments of the present disclosure provide an optical module and a head mounted display; wherein, the optical module comprises a first lens, a second lens, and a third lens provided sequentially, a beam splitter is provided between the second lens and the first lens, and a first phase retarder and a polarization reflection film provided on either side of the third lens. The first lens is configured for transmitting incident light and an optical path difference between an optical path at a 1.0 aperture of the first lens and a central optical path of the first lens is 0.25~0.5 times of the central optical path.

16 Claims, 13 Drawing Sheets

(56)        References Cited

U.S. PATENT DOCUMENTS

| | | | | |
|---|---|---|---|---|
| 2016/0370578 A1* | 12/2016 | Guenter | ............ | G02B 27/0012 |
| 2018/0039049 A1* | 2/2018 | Lee | ......................... | G02B 13/06 |
| 2018/0307000 A1* | 10/2018 | Lai | ........................... | G02B 9/04 |
| 2019/0187353 A1* | 6/2019 | Kuo | ........................ | G02B 3/04 |
| 2019/0346661 A1* | 11/2019 | Yeh | ................... | G02B 13/0045 |
| 2020/0096736 A1* | 3/2020 | Chang | ............... | G02B 13/0035 |
| 2020/0096738 A1* | 3/2020 | Chang | .................... | H04N 23/55 |
| 2020/0379226 A1* | 12/2020 | Steiner | ................ | G02B 27/283 |
| 2020/0409037 A1* | 12/2020 | Kuo | ........................ | G02B 5/005 |
| 2021/0173134 A1* | 6/2021 | Peng | ................... | G02B 5/3016 |
| 2021/0173179 A1* | 6/2021 | Leu | ................... | G02B 27/0172 |
| 2021/0405330 A1* | 12/2021 | Dang | ....................... | G02B 9/64 |
| 2022/0091373 A1* | 3/2022 | Saiga | ................ | G02B 13/0035 |
| 2023/0019936 A1* | 1/2023 | Lee | ......................... | G02B 9/64 |

* cited by examiner

OPTICAL MODULE AND HEAD MOUNTED DISPLAY

CROSS-REFERENCE TO RELATED APPLICATIONS

The present disclosure is a National Stage of International Application No. PCT/CN2022/101436, filed on Jun. 27, 2022, which claims priority to a Chinese patent application No. 202210560045.9 filed with the CNIPA on May 19, 2022, both of which are hereby incorporated by reference in their entireties.

TECHNICAL FIELD

Embodiments of the present disclosure relate to the technical field of near-eye display imaging, and particularly to an optical module and a head mounted display.

BACKGROUND

In recent years, augmented reality (AR) and virtual reality (VR) technologies have been applied and rapidly developed in smart wearable devices, for example. Core components of both AR and VR technologies are optical modules. The quality of the display effect of the optical module directly determines the quality of the smart wearable device.

In the prior art, to achieve a miniaturized and lightweight virtual reality imaging system, it is necessary to use smaller displays. However, under the same optical specifications (such as field of view angle, imaging quality, etc.), the smaller the size of the display, the more stringent the requirements become for the optical module. Most existing folded optical path solutions include two lenses. For small screens, the optical module must provide a large focal power and a significant bending angle for the peripheral field of view, which makes it difficult to achieve simultaneous clear imaging in both the central and peripheral fields of view. This also leads to a problem where field curvature is difficult to eliminate, thereby impacting the imaging effect.

SUMMARY

An objective of the present disclosure is to provide new technical solutions for an optical module and a head mounted display.

In a first aspect, the present disclosure provides an optical module, which includes a first lens, a second lens, and a third lens provided sequentially;

the first lens is configured for transmitting incident light;

a beam splitter is provided between the second lens and the first lens;

a first phase retarder and a polarization reflection film are provided on either side of the third lens;

an optical path difference between an optical path at 1.0 aperture of the first lens and a central optical path of the first lens is 0.25~0.5 times of the central optical path.

Optionally, the optical path difference between the optical path at 1.0 aperture of the first lens and the central optical path of the first lens is −1.6 to −1.

Optionally, the optical path difference between the optical path at 1.0 aperture of the first lens and the central optical path of the first lens is −1.58 to −1.2.

Optionally, an optical path difference between an optical path at 0.7 to 0.9 aperture of the first lens and the central optical path of the first lens is −1.5 to −0.05.

Optionally, an optical path difference between an optical path at 0.7 aperture of the first lens and the central optical path of the first lens is −1 to −0.05;

an optical path difference between an optical path at 0.8 aperture of the first lens and the central optical path of the first lens is −1.2 to −0.3;

an optical path difference between an optical path at 0.9 aperture of the first lens and the central optical path of the first lens is −1.5 to −0.5.

Optionally, central thickness $T_1$ of the first lens is 3 mm$<T_1<$6 mm;

the first lens includes a first surface and a second surface, both of which are aspherical surfaces.

Optionally, the first lens has a focal power $\varphi_1$, which is positive and satisfies: $0<\varphi_1<0.01$.

Optionally, the second lens includes a third surface and a fourth surface, the third surface is adjacent to the second surface and is an aspherical surface, and the fourth surface is a flat surface or an aspherical surface;

the third lens includes a fifth surface and a sixth surface, both of which are aspherical surfaces, and the fifth surface is adjacent to the fourth surface.

Optionally, the first phase retarder and the polarization reflection film are sequentially provided between the fourth surface and the fifth surface.

Optionally, the optical module further includes a polarizing film, which is provided between the fifth surface and the polarization reflection film.

Optionally, the polarization reflection film and the polarizing film are stacked to form a film layer structure and are attached to the fifth surface;

the first phase retarder is attached to the fourth surface.

Optionally, the beam splitter has a reflectivity of 47% to 53%.

Optionally, the first lens, the second lens, and the third lens have a refractive index n: 1.4$<$n$<$1.7;

the first lens, the second lens, and the third lens have an Abbe number v: 20$<$v$<$75.

Optionally, the optical module further includes a display, which is configured for emitting circularly polarized light or linearly polarized light;

when the display emits the linearly polarized light, a second phase retarder is provided between the display and the first lens, and is configured for converting the linearly polarized light into circularly polarized light.

Optionally, the display has a size of 1 inch to 2.1 inches.

In a second aspect, the present disclosure provides a head mounted display, which includes:

a housing; and the above-mentioned optical module.

According to the embodiments of the present disclosure, by adopting a reasonable combination of three lenses and effectively controlling the ratio of the optical path difference between the peripheral and central optical paths of the optical lens proximate to the incident light, i.e., the first lens, to the central optical path, it is possible to achieve simultaneous clear imaging in both the central and peripheral fields of view at the same image plane position. This helps to eliminate field curvature, resulting in an optical module with low field curvature. Consequently, this significantly enhances the imaging quality, thereby providing users with a better visual experience.

Other features and advantages of the present disclosure will become apparent from the following detailed description of exemplary embodiments of the present disclosure with reference to the accompanying drawings.

BRIEF DESCRIPTION OF THE DRAWINGS

The accompanying drawings, which are incorporated in the description and constitute a part of the description, illustrate embodiments of the present disclosure and, together with the description thereof, serve to explain the principles of the present disclosure.

DESCRIPTION OF REFERENCE SIGNS

Figure 1:
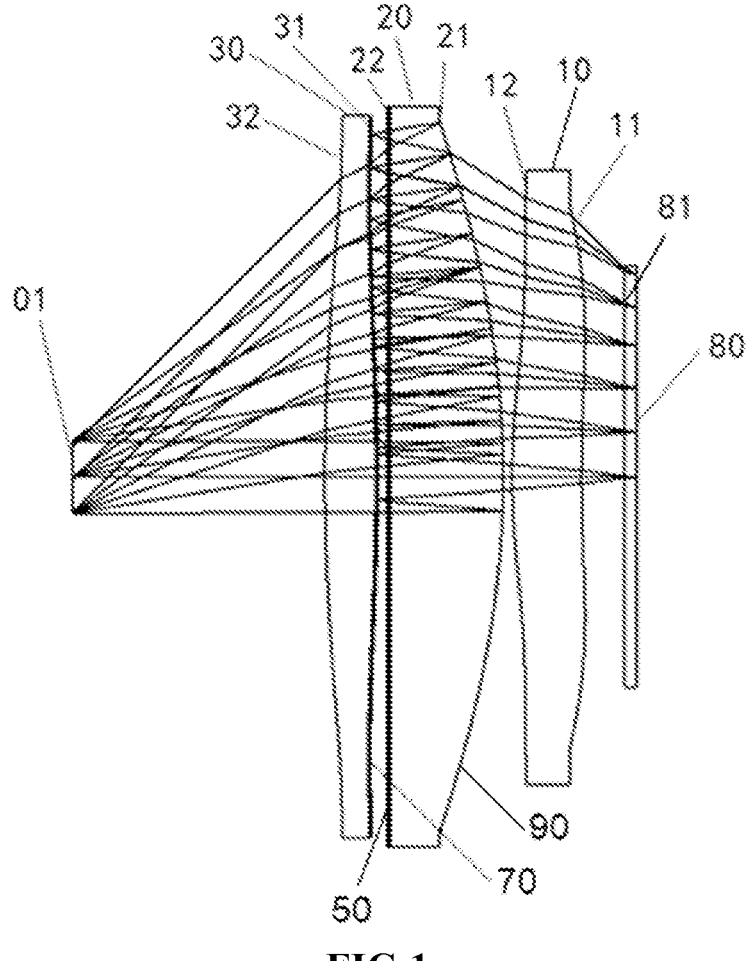
FIG. 1 is a first structural schematic diagram of an optical module according to an embodiment of the present disclosure.

10. first lens; 11. first surface; 12. second surface; 20. second lens; 21. third surface; 22. fourth surface; 30. third lens; 31. fifth surface; 32. sixth surface; 40. third anti-reflective film; 50. first phase retarder; 60. polarizing film; 70. polarization reflection film; 80. display; 81. protective glass; 90. beam splitter; 01. human eye.

DETAILED DESCRIPTION

Various exemplary embodiments of the present disclosure will now be described in detail with reference to the accompanying drawings. It is to be noted that unless otherwise specified, the relative arrangements, numerical expressions and values of components and steps illustrated in the embodiments do not limit the scope of the present disclosure.

The description of at least one exemplary embodiment is for illustrative purpose only and in no way implies any restriction on the present disclosure, its application, or use.

Techniques, methods and devices known to those skilled in the prior art may not be discussed in detail; however, such techniques, methods and devices shall be regarded as part of the description where appropriate.

In all the examples illustrated and discussed herein, any specific value shall be interpreted as illustrative rather than restrictive. Therefore, other examples of the exemplary embodiments may have different values.

It is to be noted that similar reference numbers and alphabetical letters represent similar items in the accompanying drawings. Once an item is defined in one drawing, further reference to it may be omitted in subsequent drawings.

The optical module and the head mounted display provided by the embodiments of the present disclosure are described in detail below with reference to FIGS. 1 to 23.

According to an aspect of an embodiment of the present disclosure, an optical module is provided. The optical module is a folded optical path optical structure design, which may include, for example, three optical lenses and can be suitably applied to a head mounted display (HMD). For example, the VR headset may include VR glasses or a VR helmet, which is not specifically limited by embodiments of the present disclosure.

Embodiments of the present disclosure provide an optical module, as shown in FIGS. 1, 3, 4, 10, and 16. The optical module includes a first lens 10, a second lens 20, and a third lens 30 provided sequentially;

the first lens 10 is configured for transmitting incident light;

a beam splitter 90 is provided between the second lens 20 and the first lens 10;

a first phase retarder 50 (also known as a quarter-wave plate) and a polarization reflection film 70 are provided on either side of the third lens 30;

an optical path difference between an optical path at 1.0 aperture (also known as maximum aperture) of the first lens 10 and a central optical path of the first lens 10 is 0.25~0.5 times of the central optical path.

In existing folded optical path optical modules, there are typically included two optical lenses. When using a smaller display, the optical module needs to provide a larger focal power. In this case, the bending angle of the peripheral field of view is relatively large, making it difficult to achieve simultaneous clear imaging of both the central and peripheral fields of view, and thus unable to achieve an optical module with low field curvature.

In the embodiments of the present disclosure, three optical lenses are used, namely the first lens 10, the second lens 20, and the third lens 30. The first lens 10 is provided proximate to the incident light, meaning that the incident light will first enter the first lens 10. The first lens 10 may be used to transmit the incident light. In the embodiment of the present disclosure, by controlling the ratio of the optical path difference between the peripheral optical path and the central optical path of the first lens 10 to the central optical path thereof, it is possible to achieve simultaneous clear imaging of the central and peripheral fields of view on the same plane, thereby realizing an optical module with low field curvature.

In the embodiment of the present disclosure, the optical path difference between the optical path at 1.0 aperture (1.0 aperture or maximum aperture, i.e., the peripheral field of view) and the central optical path of the first lens 10 should be the largest. From the center to the outer edge of the first lens 10, the optical path difference gradually decreases. Moreover, the closer the first lens 10 is to the outer edge, the greater the reduction in the optical path difference relative to the central optical path.

Figure 22:
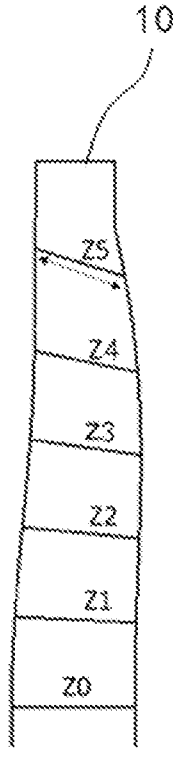
FIG. 22 is a first partial structural schematic diagram of the first lens in the optical module according to an embodiment of the present disclosure.

As shown in FIG. 22, it illustrates different positions on the first lens 10, such as $z_0$, $z_1$, $z_2$, $z_3$, $z_4$, $z_5$; wherein, $z_0$ is the center position of the first lens 10, and $z_1$ to $z_5$ are positions that gradually change from the center to the outer edge.

The optical path difference at position $z_1$ on the first lens 10 is $n^*(z_1-z_0)$, the optical path difference at position $z_2$ is $n^*(z_2-z_0)$, and so on, the optical path difference at position $z_5$ is $n^*(z_5-z_0)$; wherein, n is the refractive index of the first lens 10, and z is the optical path traveled by the light at the specified position on the first lens 10.

In the design of the embodiments of the present disclosure, the ratio (absolute value) of the optical path difference between the optical path at any specified position (or specified aperture) and the central optical path of the first lens 10 to the central optical path is given by the following formula:

$$n*(z-z_0)/n*z_0.$$

In the embodiment of the present disclosure, the optical path difference between an optical path at 1.0 aperture of the first lens 10 and a central optical path of the first lens 10 may be controlled to be 0.25~0.5 times of the central optical path. Within this ratio range, it is possible to ensure that both peripheral and central fields of view can be clearly imaged, thereby improving the imaging quality of the optical module.

In addition, the embodiments of the present disclosure also control the ratio of the optical path difference between the optical paths at different apertures and the central optical path of the first lens 10 to the central optical path, so as to better improve the optical performance of the optical module. The specifics are explained below.

For example, the optical path difference between an optical path at 0.9 aperture of the first lens 10 and a central optical path of the first lens 10 may be controlled to be 0.2 to 0.4 times of the central optical path.

For example, the optical path difference between an optical path at 0.8 aperture of the first lens 10 and a central optical path of the first lens 10 may be controlled to be 0.15 to 0.35 times of the central optical path.

For example, the optical path difference between an optical path at 0.7 aperture of the first lens 10 and a central optical path of the first lens 10 may be controlled to be 0.1 to 0.3 times of the central optical path.

For example, the optical path difference between an optical path at 0.5 aperture of the first lens 10 and a central optical path of the first lens 10 may be controlled to be 0.05 to 0.25 times of the central optical path.

For example, the optical path difference between an optical path at 0.3 aperture of the first lens 10 and a central optical path of the first lens 10 may be controlled to be 0 to 0.1 times of the central optical path.

According to the embodiments of the present disclosure, by adopting a reasonable combination of three lenses and effectively controlling the ratio of the optical path difference between the central and peripheral optical paths of the optical lens proximate to the incident light, i.e., the first lens, to the central optical path, it is possible to achieve simultaneous clear imaging in both the central and peripheral fields of view at the same image plane position, to eliminate field curvature, to achieve an optical module with low field curvature, and to effectively enhance the imaging quality, thereby providing an user with a better visual experience.

In the optical module provided by the embodiments of the present disclosure, in addition to the three optical lenses mentioned above, it may further include a beam splitter 90 provided between the first lens 10 and the second lens 20, as well as a first phase retarder 50 (also known as a quarter-wave plate) and a polarization reflection film 70 provided on either side of the third lens 30.

It should be noted that the first phase retarder 50 and the polarization reflection film 70 may be provided at appropriate positions between the second lens 20 and the third lens 30, or at appropriate positions on the side of the third lens 30 close to the human eye 01.

Of course, the first phase retarder 50 and the polarization reflection film 70 may also be attached to suitable surfaces of the second lens 20 and/or the third lens 30. Those skilled in the art may flexibly adjust the specific arranging positions of the first phase retarder 50 and the polarization reflection film 70 according to needs.

Additionally, the first phase retarder 50 and the polarization reflection film 70 may be attached together or provided spaced apart, which is not specifically limited in embodiments of the present disclosure.

Here, the first phase retarder 50 may be used to alter the polarization state of light in the folded optical path structure. For example, it is possible to convert the linearly polarized light into the circularly polarized light, or vice versa.

Here, the polarization reflection film 70 may be used to transmit the P-polarized light and reflect the S-polarized light, or to transmit the S-polarized light and reflect the P-polarized light.

The first phase retarder 50 and the polarization reflection film 70 work together to analyze and transmit light.

In the entire optical path structure, the incident light entering the first lens 10, for example, is the circularly polarized light.

Thus, the circularly polarized light is transmitted through the first lens 10 and the second lens 20, reflected by the surface of the third lens 30 adjacent to the second lens 20, then transmitted through the surface of the second lens 20 adjacent to the third lens 30, reflected by the surface of the second lens 20 adjacent to the first lens 10, and then sequentially transmitted through the surface of the second lens 20 adjacent to the third lens and the third lens 30, such that the light may be incident into the human eye 01 for display and imaging. In this way, the human eye 01 may view a clear and complete image.

The optical module provided by the embodiments of the present disclosure is a folded optical path structure design. As shown in FIG. 1, FIG. 4, FIG. 10, and FIG. 16, the various optical lenses in the optical module are located on the same optical axis, and their arrangement is simple and easy to implement. Additionally, its size is small, and it does not occupy much space. This optical module can achieve simultaneous clear imaging of the central and peripheral fields of view on the same plane, thus realizing an optical module with low field curvature, and can be paired with a small-size display. For example, the display size may be 1 in to 2.1 in.

In some examples of the present disclosure, the optical path difference between the optical path at 1.0 aperture of the first lens and the central optical path of the first lens is −1.6 to −1.

In the optical module provided by the embodiments of the present disclosure, the optical path difference between the optical path at 1.0 aperture (1.0 aperture may also be referred to as the maximum aperture, which corresponds to the peripheral field of view) the first lens 10 and the central optical path of the first lens 10 proximate to the incident light, is the largest and may be controlled in a range of −1.6 to −1. From the center to the outer edge of the first lens 10, the optical path difference to the central optical path gradually decreases. The closer to the outer edge of the first lens 10, the greater the reduction in the optical path difference between that outer edge and the central optical path.

The specific ranges for the optical path differences between the optical paths at different apertures and the central optical path of the first lens 10 may be referred to in the following Table 1.

TABLE 1

| normalized radius | optical path difference lower limit | optical path difference upper limit |
|---|---|---|
| 0.000 | −0.300 | 0.300 |
| 0.046 | −0.304 | 0.296 |
| 0.092 | −0.315 | 0.285 |
| 0.137 | −0.332 | 0.268 |
| 0.183 | −0.357 | 0.243 |
| 0.228 | −0.386 | 0.214 |
| 0.273 | −0.421 | 0.179 |
| 0.318 | −0.460 | 0.140 |
| 0.363 | −0.581 | 0.098 |
| 0.407 | −0.547 | 0.053 |
| 0.451 | −0.594 | 0.006 |
| 0.495 | −0.643 | −0.043 |
| 0.539 | −0.694 | −0.094 |
| 0.583 | −0.746 | −0.146 |
| 0.627 | −0.880 | −0.280 |
| 0.672 | −0.858 | −0.258 |
| 0.717 | −0.921 | −0.321 |
| 0.763 | −0.990 | −0.390 |
| 0.812 | −1.072 | −0.472 |
| 0.864 | −1.178 | −0.578 |
| 0.923 | −1.329 | −0.729 |
| 0.958 | −1.431 | −0.831 |
| 1.000 | −1.589 | −0.989 |

Figure 23:
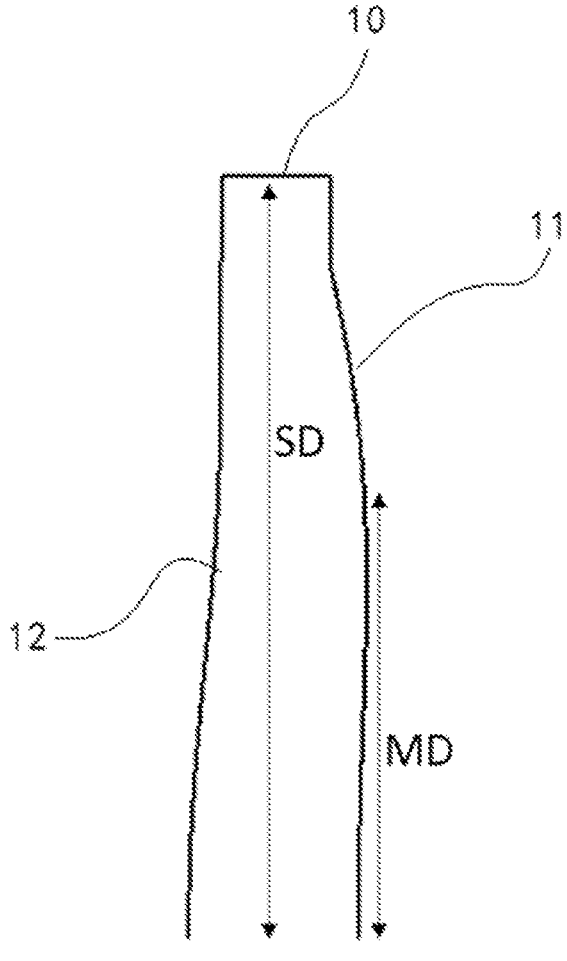
FIG. 23 is a second partial structural schematic diagram of the first lens in the optical module according to an embodiment of the present disclosure.

In the above Table 1, normalized semi-aperture=MD/SD; as shown in FIG. 23, SD refers to the maximum semi-aperture of the first lens 10, and MD refers to the distance from different apertures (different positions) on the first lens 10 to the center of the first lens 10.

The data shown in Table 1 quantitatively represents the boundaries of the optical path differences between the optical paths at different apertures of the first lens 10 and the central optical path thereof.

As shown in FIGS. 2, 5, 11, and 17, these four figures respectively illustrate the optical path differences and the defined ranges between the optical paths at different apertures and the central optical path of the first lens 10 in four different embodiments. It can be observed that the maximum absolute value of the optical path difference of the first lens 10 occurs at its maximum aperture (i.e., at 1.0 aperture or the peripheral field of view), and the range of the optical path difference between the optical path at this location and the central optical path may be controlled to −1.6 to −1. From the center to the outer edge of the first lens 10, the optical path difference gradually decreases. The closer the position is to the outer edge of the first lens 10, the greater the reduction in the optical path difference.

For example, the optical path difference between the optical path at 1.0 aperture of the first lens 10 and the central optical path of the first lens 10 may be controlled to −1.6, −1.58, or −1, which may be flexibly adjusted by those skilled in the art according to needs.

In fact, in a theoretical aberration-free system, the optical path of the central field of view is the same as that of the peripheral field of view, allowing the central field of view and the peripheral field of view to be clearly imaged on the same plane. However, due to the presence of aberrations, especially off-axis aberrations in the peripheral field of view and the optical path difference between the peripheral fields of view and the central field of view itself, both can influence the imaging of the peripheral field of view. To ensure the peripheral imaging quality, it is necessary to limit the optical path of the peripheral field of view. Traditional 2P folded optical path optical structures, due to their limited variables, find it difficult to constrain the optical path of the peripheral field of view.

In the optical module provided by the embodiments of the present disclosure, by introducing an optical lens (i.e., the above first lens 10) and placing it proximate to the incident light, it is possible to control the optical path of the peripheral field of view of the optical lens itself by changing the refractive index and thickness of the optical lens itself. It should be noted that the design of the refractive index and thickness of the first lens 10 will be described in detail below.

Figure 2:
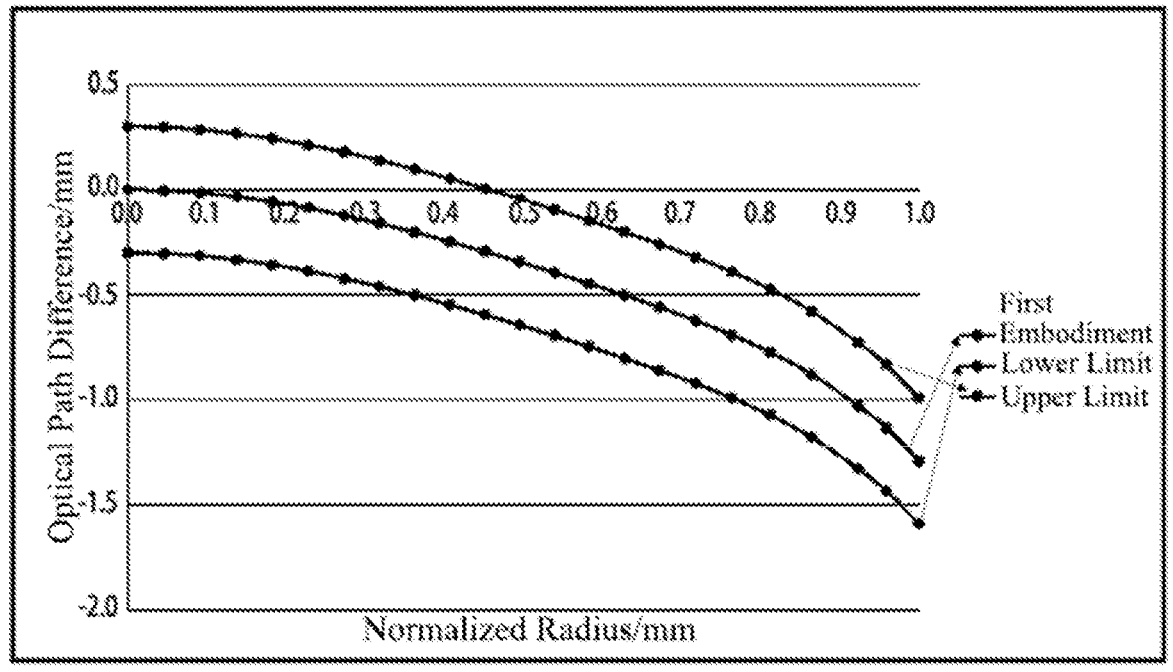
FIG. 2 is a variation diagram of optical path differences between optical paths at different apertures and a central optical path of a first lens in the optical module shown in FIG. 1.
Figure 5:
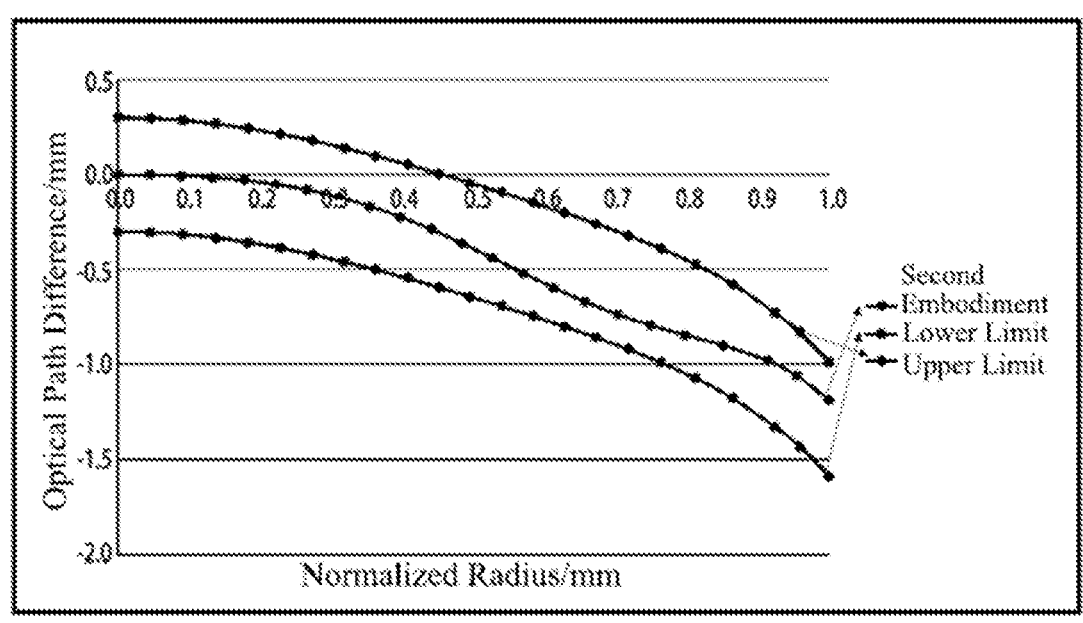
FIG. 5 is a variation diagram of optical path differences between optical paths at different apertures and a central optical path of a first lens in the optical module shown in FIG. 4.
Figure 11:
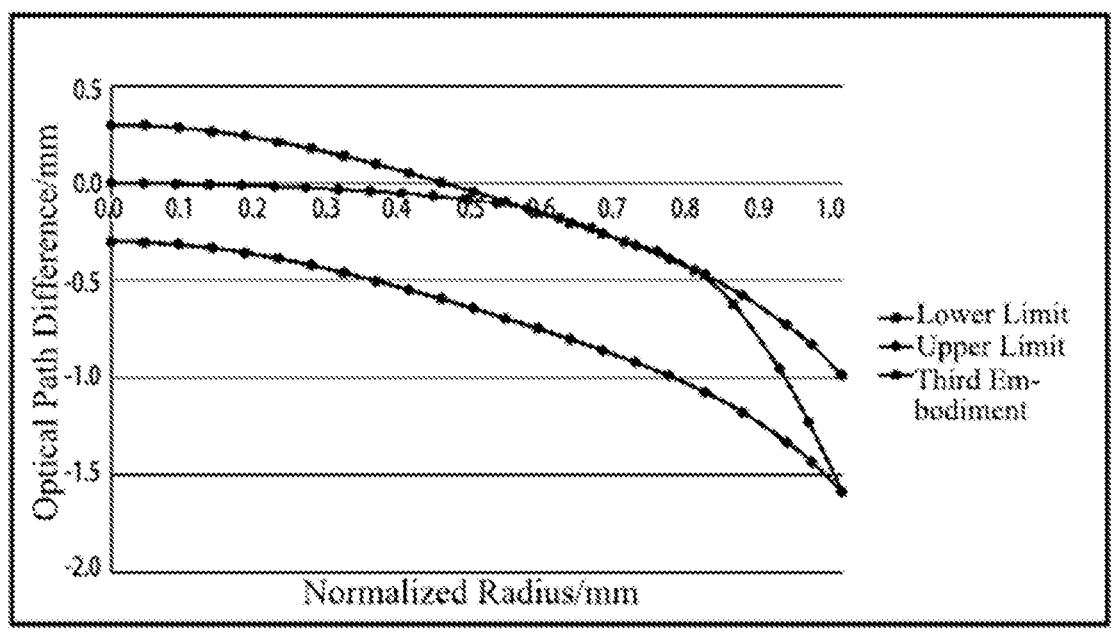
FIG. 11 is a variation diagram of optical path differences between optical paths at different apertures and a central optical path of a first lens in the optical module shown in FIG. 10.

In some examples of the present disclosure, as shown in FIGS. 2, 5, and 11, the optical path difference between the optical path at 1.0 aperture of the first lens and the central optical path of the first lens is −1.58 to −1.2. That is, the embodiment of the present disclosure has optimized the range of the optical path difference between the optical path at the maximum aperture of the first lens 10 and the central optical path of the first lens 10, and has designed the range to be −1.58 to −1.2.

In the embodiment of the present disclosure, to ensure the imaging quality of the peripheral field of view, it is necessary to reasonably limit the range of the optical path difference between the peripheral field of view and the central field of view. The range of the optical path difference between the optical path at the maximum aperture (i.e., 1.0 aperture) and the central optical path of the first lens 10 proximate to the incident light, may be controlled within the range of −1.58 to −1.2. In this way, it is possible to better ensure consistency in the optical paths of the central and peripheral fields of view, thus enabling clear imaging of the central and peripheral fields of view on the same plane, ensuring peripheral field of view, and improving the final imaging effect, such that the user obtains a better visual experience.

For example, the optical path difference between the optical path at 1.0 aperture of the first lens 10 and the central optical path of the first lens 10 may be set to −1.58, −1.3, −1.25, or −1.2, which may be flexibly adjusted by those skilled in the art according to needs.

In some examples of the present disclosure, as shown in FIGS. 2, 5, 11, and 17, the optical path difference between the optical path at 0.7 to 0.9 aperture of the first lens and the central optical path of the first lens is −1.5 to −0.05.

In the embodiments of the present disclosure, the optical path differences between the optical paths at positions of the first lens 10 close to the periphery, i.e., at 0.7 to 0.9 aperture, and by controlling the range of the optical path difference between the optical path at 1.0 aperture and the central optical path described above, it is possible to better ensure the peripheral imaging quality.

In some examples of the present disclosure, the optical path difference between the optical path at 0.7 aperture of the first lens 10 and the central optical path of the first lens 10 is −1 to −0.05; the optical path difference between the optical path at 0.8 aperture of the first lens 10 and the central optical path of the first lens 10 is −1.2 to −0.3; the optical path difference between the optical path at 0.9 aperture of the first lens 10 and the central optical path of the first lens 10 is −1.5 to −0.5.

Through further optimization, the embodiments of the present disclosure have reasonably controlled the optical path differences between the optical paths at 0.7 aperture, 0.8 aperture, and 0.9 aperture of the first lens 10 and the central optical path of the first lens 10, to achieve better imaging effects for the peripheral field of view.

For example, the optical path difference between the optical path at 0.7 aperture of the first lens 10 and the central optical path of the first lens 10 may be −0.6, −0.74, −0.3, or −0.9, which may be flexibly adjusted by those skilled in the art according to needs.

For example, the optical path difference between the optical path at 0.8 aperture of the first lens 10 and the central optical path of the first lens 10 may be −0.75, −0.85, −1.01, or −0.48, which may be flexibly adjusted by those skilled in the art according to needs.

For example, the optical path difference between the optical path at 0.9 aperture of the first lens 10 and the central optical path of the first lens 10 may be −0.95, −0.94, −1.1, or −0.97, which may be flexibly adjusted by those skilled in the art according to needs.

Additionally, in the embodiments of the present disclosure, the optical path difference between the optical path at 0.3 to 0.7 aperture of the first lens 10 and the central optical path of the first lens 10 is designed to be controlled to −1 to 0.2.

Here, 0.3 to 0.7 aperture is the range close to the central field of view. That is to say, in the embodiments of the present disclosure, not only is the optical path difference range of the peripheral field of view of the first lens 10 controlled, but also the optical path difference range of the first lens 10 close to the central field of view is reasonably controlled.

In the embodiments of the present disclosure, a scheme that reasonably adjusting the optical path differences between the optical paths at different apertures of the first lens 10 proximate to the incident light and the central optical path is adopted, which makes the design of the first lens 10 finer. By finely controlling the optical path difference ranges of the peripheral field of view and the central field of view, it is possible to better achieve simultaneous clear imaging of the peripheral field of view and the central field of view on the same image plane, thus realizing an optical module with low field curvature.

For example, the optical path difference between the optical path at 0.3 aperture of the first lens 10 and the central optical path of the first lens 10 may be controlled to −0.5 to 0.2, the optical path difference between the optical path at 0.5 aperture of the first lens 10 and the central optical path of the first lens 10 may be controlled to −0.7 to 0.1, and the optical path difference between the optical path at 0.7 aperture of the first lens 10 and the central optical path of the first lens 10 may be controlled to −1 to −0.05.

For example, the optical path difference between the optical path at 0.3 aperture of the first lens 10 and the central optical path of the first lens 10 may be controlled to −0.14, −0.11, −0.02, or −0.3, which may be flexibly adjusted by those skilled in the art according to needs.

For example, the optical path difference between the optical path at 0.5 aperture of the first lens 10 and the central optical path of the first lens 10 may be controlled to −0.34, −0.44, −0.4, or −0.6, which may be flexibly adjusted by those skilled in the art according to needs.

For example, the optical path difference between the optical path at 0.7 aperture of the first lens 10 and the central optical path of the first lens 10 may be controlled to −0.6, −0.74, −0.3, or −0.9, which may be flexibly adjusted by those skilled in the art according to needs.

The optical module provided by the embodiments of the present disclosure also further optimizes the optical path difference of the central field of view of the first lens 10 respectively, specifically the optical path difference between the optical paths at 0.3 to 0.7 apertures and the central optical path. By combining the control of the optical path difference between the peripheral field of view and the central optical path, it is possible to better control the imaging effect. The image formed in the human eye 01 may completely eliminate field curvature, such that a user obtains an excellent visual experience.

In some examples of the present disclosure, central thickness $T_1$ of the first lens 10 is 3 mm$<T_1<$6 mm, as shown in FIGS. 1, 4, 10 and 16. The first lens 10 includes a first surface 11 and a second surface 12, both of which are aspherical surfaces.

Optionally, a first anti-reflective film is provided on one side of the first surface 11, and a second anti-reflective film is provided between the second surface 12 and the beam splitter 90.

In the design of the embodiments of the present disclosure, the first lens 10 is located on one side of the entire optical module where the light is incident. External incident light first passes through the first lens 10. Anti-reflective films may be provided on both sides of the first lens 10 respectively, to allow light to completely pass through the first lens 10 as much as possible and then be incident into the second lens 20.

In some examples of the present disclosure, the first lens 10 has a focal power $\varphi_1$, which is positive and satisfies: $0<\varphi_1<0.01$. It is not necessary for the first lens 10 to provide a large focal power to the optical module.

In some examples of the present disclosure, as shown in FIGS. 1, 4, 10, and 16, the second lens 20 includes a third surface 21 and a fourth surface 22, the third surface 21 is adjacent to the second surface 12 and is an aspherical surface, and the fourth surface 22 is a flat surface or an aspherical surface;

the third lens 30 includes a fifth surface 31 and a sixth surface 32, both of which are aspherical surfaces, and the fifth surface 31 is adjacent to the fourth surface 22.

Optionally, a fourth anti-reflective film is provided on one side of the fourth surface 22.

In the embodiments of the present disclosure, the second lens 20 has a focal power $\varphi_2$, which is positive and satisfies: $0<\varphi_2<0.01$. It is not necessary for the second lens 20 to provide a large focal power.

Here, an anti-reflective film may be provided on the fourth surface 22 of the third lens 30 or on one side of the fourth surface 22, such that the light can enter into the human eye 01 as completely as possible for displaying an image.

Figure 3:
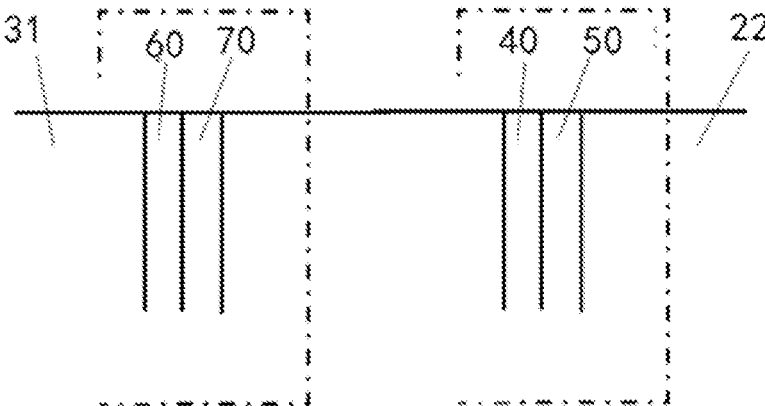
FIG. 3 is a schematic diagram showing the film layer structures separately attached to a fourth surface of a second lens and a sixth surface of a third lens in the optical module according to an embodiment of the present disclosure.

In some examples of the present disclosure, as shown in FIG. 3, the first phase retarder 50 and the polarization reflection film 70 are sequentially provided between the fourth surface 22 and the fifth surface 31.

Here, the first phase retarder 50 may be provided on one side of the fourth surface 22 of the second lens 20, and the polarization reflection film 70 may be provided on one side of the fifth surface 31 of the third lens 30. In this case, the first phase retarder 50 and the polarization reflection film 70 are spaced apart in the optical structure.

For example, the first phase retarder 50 may be provided at an appropriate position between the fourth surface 22 of the second lens 20 and the fifth surface 31 of the third lens 30; or, the first phase retarder 50 may be provided at an appropriate position close to the fourth surface 22 of the second lens 20.

Of course, the first phase retarder 50 may also be directly attached to the fourth surface 22 of the second lens 20.

For example, the polarization reflection film 70 may be provided at an appropriate position between the fourth surface 22 of the second lens 20 and the fifth surface 31 of the third lens 30; or, the polarization reflection film 70 may be provided at an appropriate position close to the fifth surface 31 of the third lens 30.

Of course, the polarization reflection film 70 may also be directly attached to the fifth surface 31 of the third lens 30.

Additionally, the first phase retarder 50 and the polarization reflection film 70 may be stacked and attached to the sixth surface 32 of the third lens 30. In this case, the first phase retarder 50 and the polarization reflection film 70 may be attached together. Those skilled in the art may reasonably adjust the positions of the first phase retarder 50 and the polarization reflection film 70 according to needs.

Optionally, please refer to FIG. 3 again, a third anti-reflective film 40 is provided between the fourth surface 22 and the first phase retarder 50; the first phase retarder 50 and the third anti-reflective film 40 are stacked to form a film layer structure and are attached to the fourth surface 22.

In the embodiments of the present disclosure, the central thickness $T_2$ of the second lens 20 may be in a range: 3 mm$<T_2<$8 mm. The second lens 20 includes two optical surfaces, namely the third surface 21 and the fourth surface 22, wherein the third surface 21 is adjacent to the second surface 12 of the first lens 10, and may be designed as an aspheric surface. The beam splitter 90 may be provided on the third surface 21 or proximate to the third surface 21. The fourth surface 22 is a flat surface or an aspheric surface. A film layer structure may be provided on the surface of the fourth surface 22 or proximate to the surface of the fourth surface 22. The film layer structure may include the above first phase retarder 50 and the third anti-reflective film 40 for example. Here, the first phase retarder 50 may be used to change the polarization state of the light in the folded optical path structure.

In some examples of the present disclosure, please refer to FIG. 3 again, the optical module further includes a polarizing film 60, which is provided between the fifth surface 31 and the polarization reflection film 70.

Here, the polarization reflection film 70 and the polarizing film 60 may be stacked to form a film layer structure and be attached to the fifth surface 31; the first phase retarder 50 may be attached to the fourth surface 22.

In the embodiments of the present disclosure, the central thickness $T_3$ of the third lens 30 may be in a range: 3 mm$<T_3<$6 mm. The third lens 30 includes two optical surfaces, namely the fifth surface 31 and the sixth surface 32, which are both designed to be aspheric surfaces. The above polarization reflection film 70 and the polarizing film 60 may be stacked and be directly attached to the fifth surface 31.

For example, the polarization reflection film 70 may transmit the P-polarized light and reflect the S-polarized light, while the polarizing film 60 may transmit the P-polarized light, thereby reducing stray light.

In some examples of the present disclosure, the reflectivity of the beam splitter 90 is 47% to 53%.

For example, the beam splitter 90 may be a transflective film.

The beam splitter 90 may be provided on one side of the third surface 21 of the second lens 20.

For example, the beam splitter 90 may be provided at an appropriate position between the second surface 12 of the first lens 10 and the third surface 21 of the second lens 20; or, the beam splitter 90 is provided at an appropriate position close to the third surface 21 of the second lens 20.

Of course, the beam splitter 90 may also be attached to the third surface 21 of the second lens 20.

In some examples of the present disclosure, the first lens 10, the second lens 20, and the third lens 30 have a refractive index n: $1.4<n<1.7$;

the first lens 10, the second lens 20, and the third lens 30 have an Abbe number v: $20<v<75$.

For example, the refractive index of the first lens 10 is 1.54, and the Abbe number v is 56.3; the refractive index of the second lens 20 is 1.54, and the Abbe number v is 56.3; the refractive index of the third lens 30 is 1.54, and the Abbe number v is 55.7.

In the embodiments of the present disclosure, by introducing an optical lens (i.e., the above first lens 10) and placing it proximate to the incident light, it is possible to control the optical path of the peripheral field of view of the optical lens itself by changing the refractive index and thickness of the optical lens itself.

In some examples of the present disclosure, as shown in FIGS. 1, 4, 10, and 16, the optical module further includes a display 80, which is configured for emitting circularly polarized light or linearly polarized light;

when the display 80 emits the linearly polarized light, a second phase retarder is provided between the display 80 and the first lens 10, and is configured for converting the linearly polarized light into circularly polarized light.

In the embodiments of the present disclosure, the optical module may further include a display 80, an emergent surface of which is provided with a protective glass 81. The emergent surface of the display 80 may emit light towards the first lens 10, and the light may pass through the first lens 10.

In the embodiments of the present disclosure, the second phase retarder may be provided on the emergent surface of the display 80, or at an appropriate position between the display 80 and the first lens 10; or, it may be provided at an appropriate position close to the emergent surface of the display 80.

In some examples of the present disclosure, the size of the display 80 is 1 in to 2.1 in.

The optical module provided by the embodiments of the present disclosure may achieve simultaneous clear imaging of the central field of view and the peripheral field of view on the same plane, and thus may achieve an optical module with low field curvature, which may be paired with a small-sized display, such as a display of 1 in to 2.1 in, making the head mounted display smaller in size.

According to the optical module provided by the embodiments of the present disclosure, the propagation process of light in the optical module is as follows:

The display 80 emits circularly polarized light, and after being transmitted through the protective glass 81 on the surface of the display 80, the light can pass through the first lens 10 and the third surface 21 of the second lens 20. After passing through first phase retarder 50 on or near the fourth surface 22 of the second lens 20, the circularly polarized light is converted into the linearly polarized light (S-light). It is then reflected by the fifth surface 31 of the third lens 30, and again converted into the circularly polarized light after passing through the first phase retarder 50 on or near the fourth surface 22 of the second lens 20. The light then is reflected by the third surface 21 of the second lens 20, is again converted to the linearly polarized light (P-light) after passing through the first phase retarder 50 on or near the fourth surface 22 of the second lens 20, and finally enters the human eye 01 after being transmitted through the third lens 30.

sequentially; the first lens 10 is configured for transmitting incident light; a beam splitter 90 is provided between the second lens 20 and the first lens 10; a first phase retarder 50 and a polarization reflection film 70 are provided on either side of the third lens 30.

Here, the optical path difference between the optical path at 1.0 aperture of the first lens 10 and the central optical path of the first lens 10 is 0.34 times the central optical path; the optical path difference between the optical path at 0.9 aperture of the first lens 10 and the central optical path of the first lens 10 is 0.27 times the central optical path; the optical path difference between the optical path at 0.8 aperture of the first lens 10 and the central optical path of the first lens 10 is 0.2 times the central optical path; the optical path difference between the optical path at 0.7 aperture of the first lens 10 and the central optical path of the first lens 10 is 0.16 times the central optical path; the optical path difference between the optical path at 0.5 aperture of the first lens 10 and the central optical path of the first lens 10 is 0.09 times the central optical path; the optical path difference between the optical path at 0.3 aperture of the first lens 10 and the central optical path of the first lens 10 is 0.04 times the central optical path.

Here, the optical path difference at 1.0 aperture of the first lens 10 is −1.3; the optical path difference at 0.9 aperture is −0.95; the optical path difference at 0.8 aperture is −0.75; the optical path difference at 0.7 aperture is −0.6; the optical path difference at 0.5 aperture is −0.34; the optical path difference at 0.3 aperture is −0.14.

The first lens 10 includes a first surface 11 and a second surface 12; the second lens 20 includes a third surface 21 and a fourth surface 22; the third lens 30 includes a fifth surface 31 and a sixth surface 32.

The above optical module further includes a display 80, which is a small-sized display with a size range of 1 in to 2.1 in.

In the optical module provided by the first embodiment, the optical parameters of the first lens 10, the second lens 20, and the third lens 30 are specifically as shown in Table 2.

TABLE 2

| surface | Radius (mm) | Thickness (mm) | material | Conic | A2 | A4 | A6 |
|---|---|---|---|---|---|---|---|
| 32 | 126.2619 | 2.8000 | K26R | 0.0000 | 0.0000 | 1.824E−07 | −1.736E−10 |
| 31 | −125.8352 | 0.5000 | air | 0.0000 | 0.0000 | 1.441E−05 | −4.881E−08 |
| 22 | Infinity | 6.3000 | APEL | 0.0000 | 0.0000 | 0.000E+00 | 0.000E+00 |
| 21 | −51.2466 | 0.5000 | air | 0.1337 | 0.0000 | 2.324E−06 | 2.214E−08 |
| 12 | 38.0560 | 3.8411 | APEL | 0.0000 | 0.0000 | −8.146E−05 | 1.559E−07 |
| 11 | 75.0093 | 2.3488 | air | 0.0000 | 0.0000 | −4.827E−06 | 9.839E−08 |

| surface | A8 | A10 | A12 | A14 | A16 |
|---|---|---|---|---|---|
| 32 | 0.000E+00 | 0.000E+00 | 0.000E+00 | 0.000E+00 | 0.000E+00 |
| 31 | 1.058E−10 | −1.126E−13 | 0.000E+00 | 0.000E+00 | 0.000E+00 |
| 22 | 0.000E+00 | 0.000E+00 | 0.000E+00 | 0.000E+00 | 0.000E+00 |
| 21 | −1.064E−11 | 7.260E−14 | −8.044E−17 | 0.000E+00 | 0.000E+00 |
| 12 | 0.000E+00 | 0.000E+00 | 0.000E+00 | 0.000E+00 | 0.000E+00 |
| 11 | 0.000E+00 | 0.000E+00 | 0.000E+00 | 0.000E+00 | 0.000E+00 |

The optical modules provided by embodiments of the present disclosure are specifically described below through four embodiments.

First Embodiment

Figure 4:
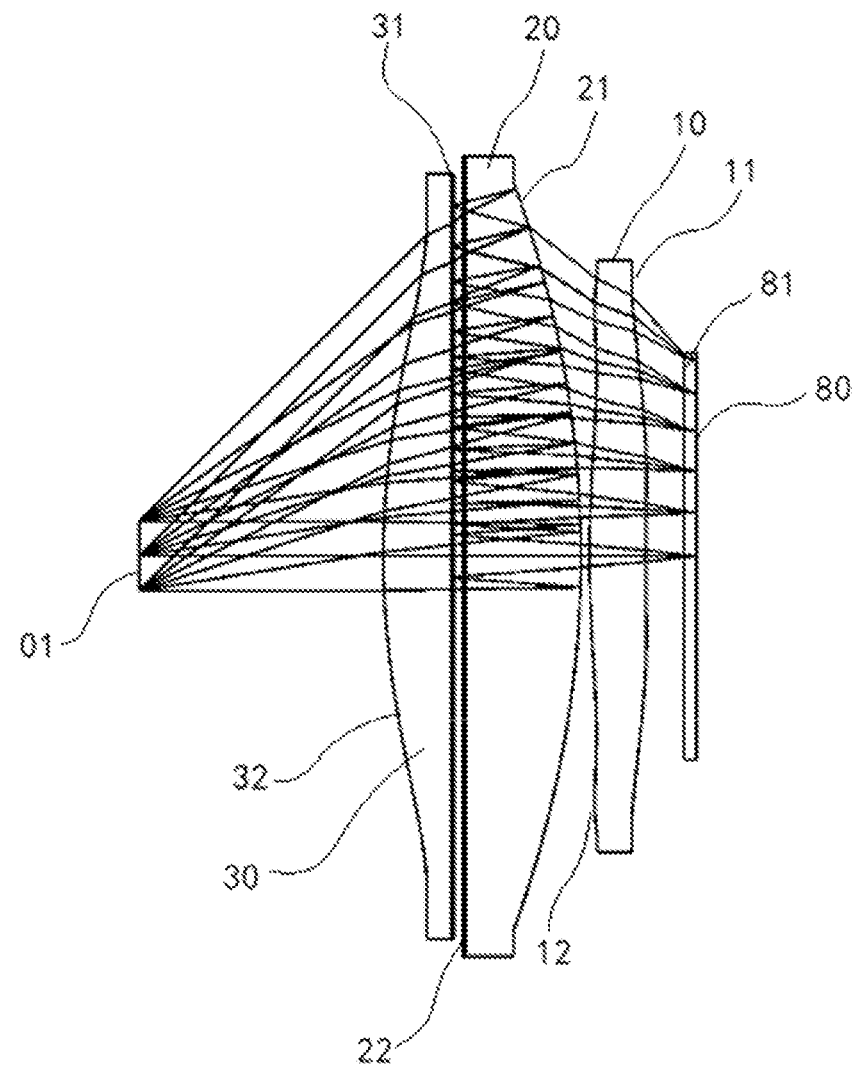
FIG. 4 is a second structural schematic diagram of the optical module according to an embodiment of the present disclosure.

The optical module provided by the first embodiment of the present disclosure, as shown in FIG. 1, includes a first lens 10, a second lens 20, and a third lens 30 provided Second Embodiment The optical module provided by the second embodiment of the present disclosure, as shown in FIG. 4, includes a first lens 10, a second lens 20, and a third lens 30 provided sequentially; the first lens 10 is configured for transmitting incident light; a beam splitter 90 is provided between the second lens 20 and the first lens 10; a first phase retarder 50 and a polarization reflection film 70 are provided on either side of the third lens 30.

Here, the optical path difference between the optical path at 1.0 aperture of the first lens 10 and the central optical path of the first lens 10 is 0.37 times the central optical path; the optical path difference between the optical path at 0.9 aperture of the first lens 10 and the central optical path of the first lens 10 is 0.31 times the central optical path; the optical path difference between the optical path at 0.8 aperture of the first lens 10 and the central optical path of the first lens 10 is 0.26 times the central optical path; the optical path difference between the optical path at 0.7 aperture of the first lens 10 and the central optical path of the first lens 10 is 0.23 times the central optical path; the optical path difference between the optical path at 0.5 aperture of the first lens 10 and the central optical path of the first lens 10 is 0.14 times the central optical path; the optical path difference between the optical path at 0.3 aperture of the first lens 10 and the central optical path of the first lens 10 is 0.04 times the central optical path.

Here, the optical path difference at 1.0 aperture of the first lens 10 is −1.2; the optical path difference at 0.9 aperture is −0.94; the optical path difference at 0.8 aperture is −0.85; the optical path difference at 0.7 aperture is −0.74; the optical path difference at 0.5 aperture is −0.44; the optical path difference at 0.3 aperture is −0.11.

The first lens 10 includes a first surface 11 and a second surface 12; the second lens 20 includes a third surface 21 and a fourth surface 22; the third lens 30 includes a fifth surface 31 and a sixth surface 32.

The above optical module further includes a display 80, which is a small-sized display with a size range of 1 in to 2.1 in.

In the optical module provided by the second embodiment of the present disclosure, the optical parameters of the first lens 10, the second lens 20, and the third lens 30 are specifically as shown in Table 3.

Figure 6:
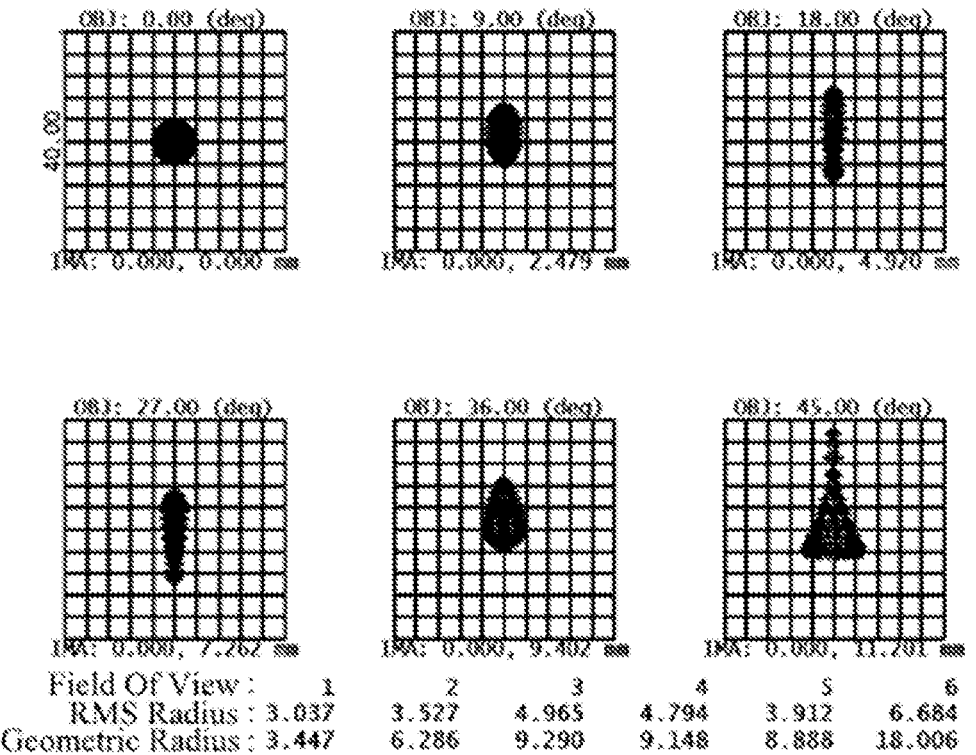
FIG. 6 is a schematic diagram of a point array of the optical module shown in FIGS. 1 and 4.

The point array refers to a dispersion pattern scattered in a certain range, which is formed when many rays of light emitted from one point, after passing through the optical module, are no longer concentrated at the same point of intersection with the image plane due to aberration, and may be used to evaluate the imaging quality of the optical module. As shown in FIG. 6, in the first and second embodiments, the maximum value of the image points in the point array corresponds to the maximum field of view, the maximum value of the image points in the point array is less than 7 μm. The difference between the central field of view and the peripheral field of view is less than 4 μm, and the central field of view and the peripheral field of view are simultaneously clearly imaged on the same image plane.

Figure 7:
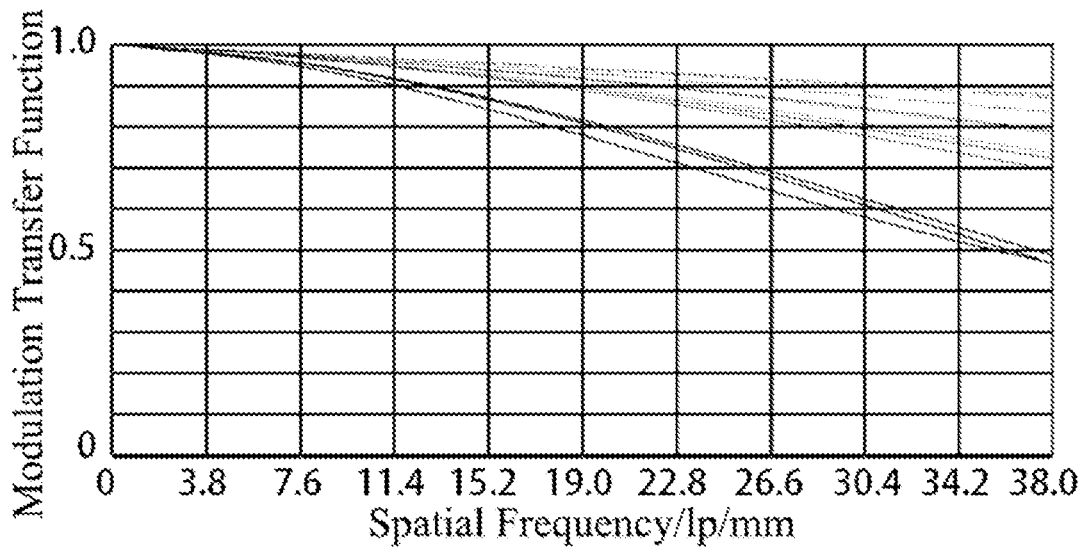
FIG. 7 is an MTF graph of the optical module shown in FIGS. 1 and 4.

The MTF graph is a modulation transfer function graph, which characterizes the imaging clarity of the optical module by the contrast of black and white line pairs. As shown in FIG. 7, in the first and second embodiments, the MTF at 38 lp/mm is greater than 0.45, causing clear imaging.

Figure 8:
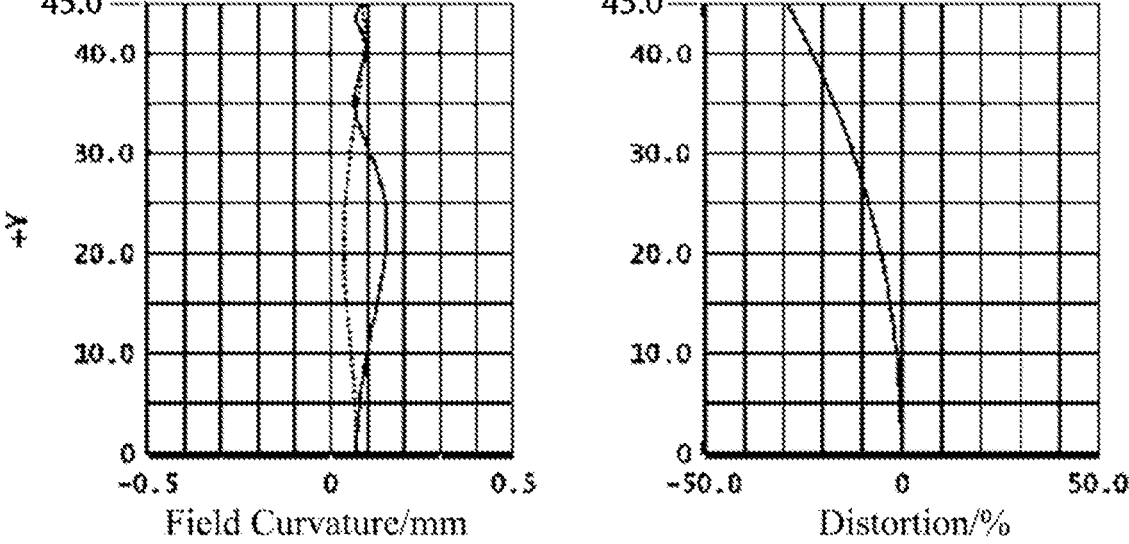
FIG. 8 is a field curvature distortion diagram of the optical module shown in FIGS. 1 and 4.

The field curvature distortion diagram reflects the difference in the position of the image plane that generates a clear image under different fields of view. In the first and second embodiments, as shown in FIG. 8, the maximum field curvature distortion occurs near the 0.5 field of view, with a maximum value of less than 0.12 mm.

Figure 9:
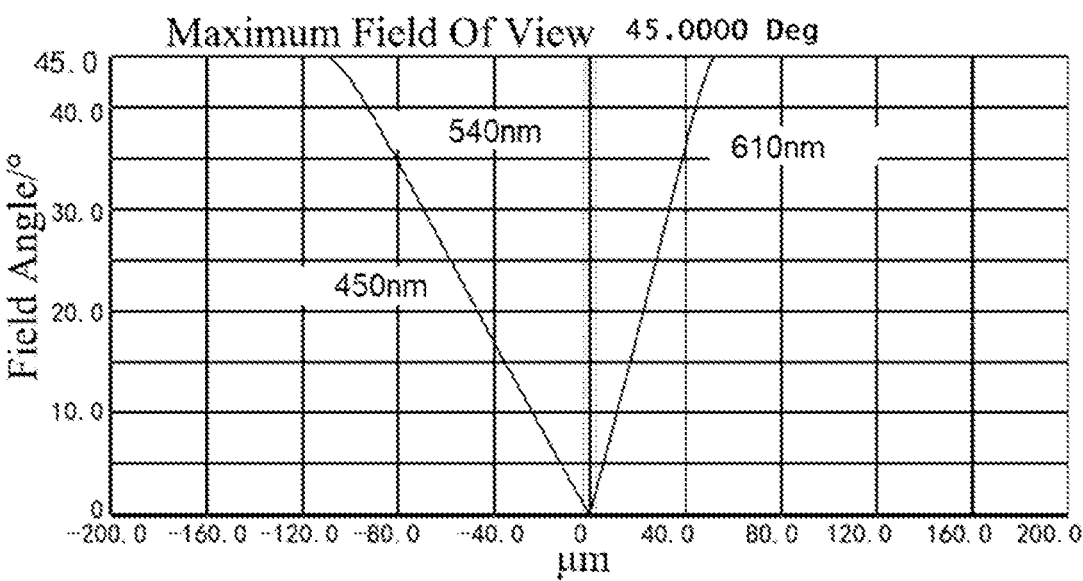
FIG. 9 is a lateral chromatic distortion diagram of the optical module shown in FIGS. 1 and 4.

The lateral chromatic distortion, also known as magnification chromatic aberration, primarily refers to the difference between the focal positions of blue and red light on the image plane when one main ray of a complex color on the object side becomes multiple rays on the image side due to dispersion in the refracting system. In the first and second embodiments, as shown in FIG. 9, the maximum chromatic dispersion occurs at 1 field of view position, with the maximum chromatic aberration value of the optical module being less than 160 μm.

Third Embodiment

Figure 10:
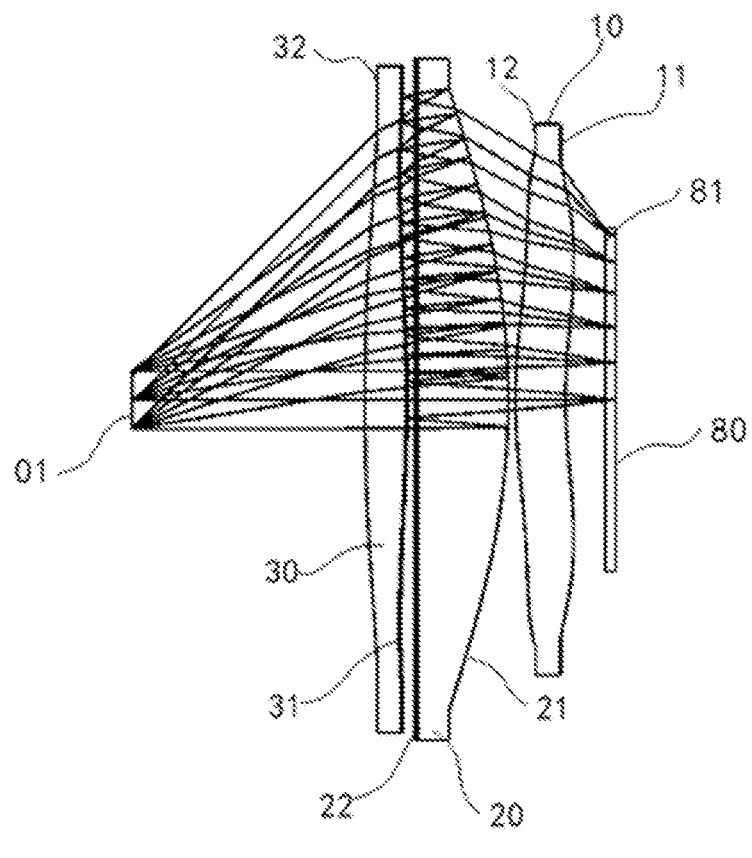
FIG. 10 is a third structural schematic diagram of the optical module according to an embodiment of the present disclosure.

The optical module provided by the third embodiment of the present disclosure, as shown in FIG. 10, includes a first

TABLE 3

| surface | radius(mm) | thickness(mm) | material | Conic | A2 | A4 | A6 |
|---|---|---|---|---|---|---|---|
| 32 | 47.7782 | 3.9800 | K26R | 0.0000 | 0.0000 | −7.276E−06 | 8.837E−11 |
| 31 | Infinity | 0.5000 | air | 0.0000 | 0.0000 | 0.000E+00 | 0.000E+00 |
| 22 | Infinity | 6.6082 | APEL | 0.0000 | 0.0000 | 0.000E+00 | 0.000E+00 |
| 21 | −59.9087 | 0.5000 | air | −4.3149 | 0.0000 | −5.423E−08 | −5.733E−10 |
| 12 | 71.8324 | 3.2143 | APEL | 0.0000 | 0.0000 | −1.180E−05 | −3.457E−07 |
| 11 | 111.6623 | 2.2006 | air | 32.8952 | 0.0000 | −4.006E−05 | 8.374E−07 |

| surface | A8 | A10 | A12 | A14 | A16 |
|---|---|---|---|---|---|
| 32 | −2.458E−11 | −1.454E−14 | 0.000E+00 | 0.000E+00 | 0.000E+00 |
| 31 | 0.000E+00 | 0.000E+00 | 0.000E+00 | 0.000E+00 | 0.000E+00 |
| 22 | 0.000E+00 | 0.000E+00 | 0.000E+00 | 0.000E+00 | 0.000E+00 |
| 21 | 3.621E−11 | −1.236E−13 | 1.965E−16 | 0.000E+00 | 0.000E+00 |
| 12 | 1.782E−09 | −2.236E−12 | 0.000E+00 | 0.000E+00 | 0.000E+00 |
| 11 | −2.233E−09 | 2.181E−12 | 0.000E+00 | 0.000E+00 | 0.000E+00 |

For the optical modules illustrated in the first and second embodiments, as shown in FIGS. 6 to 9: FIG. 6 is a schematic diagram of a point array of the optical module; FIG. 7 is an MTF graph of the optical module; FIG. 8 is a field curvature distortion diagram of the optical module; FIG. 9 is a lateral chromatic distortion diagram of the optical module.

The above table 2 provides the design parameters for the first embodiment. The above table 3 provides the design parameters for the second embodiment.

lens 10, a second lens 20, and a third lens 30 provided sequentially; the first lens 10 is configured for transmitting incident light; a beam splitter 90 is provided between the second lens 20 and the first lens 10; a first phase retarder 50 and a polarization reflection film 70 are provided on either side of the third lens 30.

Here, the optical path difference between the optical path at 1.0 aperture of the first lens 10 and the central optical path of the first lens 10 is 0.32 times the central optical path; the optical path difference between the optical path at 0.9 aperture of the first lens 10 and the central optical path of the first lens 10 is 0.29 times the central optical path; the optical path difference between the optical path at 0.8 aperture of the first lens 10 and the central optical path of the first lens 10 is 0.26 times the central optical path; the optical path difference between the optical path at 0.7 aperture of the first lens 10 and the central optical path of the first lens 10 is 0.23 times the central optical path; the optical path difference between the optical path at 0.5 aperture of the first lens 10 and the central optical path of the first lens 10 is 0.16 times the central optical path; the optical path difference between the optical path at 0.3 aperture of the first lens 10 and the central optical path of the first lens 10 is 0.05 times the central optical path.

Here, the optical path difference at 1.0 aperture of the first lens 10 is −1.58; the optical path difference at 0.9 aperture is −1.1; the optical path difference at 0.8 aperture is −1.01; the optical path difference at 0.7 aperture is −0.3; the optical path difference at 0.5 aperture is −0.4; the optical path difference at 0.3 aperture is −0.02.

The first lens 10 includes a first surface 11 and a second surface 12; the second lens 20 includes a third surface 21 and a fourth surface 22; the third lens 30 includes a fifth surface 31 and a sixth surface 32.

The above optical module further includes a display 80, which is a small-sized display with a size range of 1 in to 2.1 in.

In the optical module provided by the third embodiment of the present disclosure, the optical parameters of the first lens 10, the second lens 20, and the third lens 30 are specifically as shown in Table 4.

field of view and the peripheral field of view are simultaneously clearly imaged on the same image plane.

Figure 13:
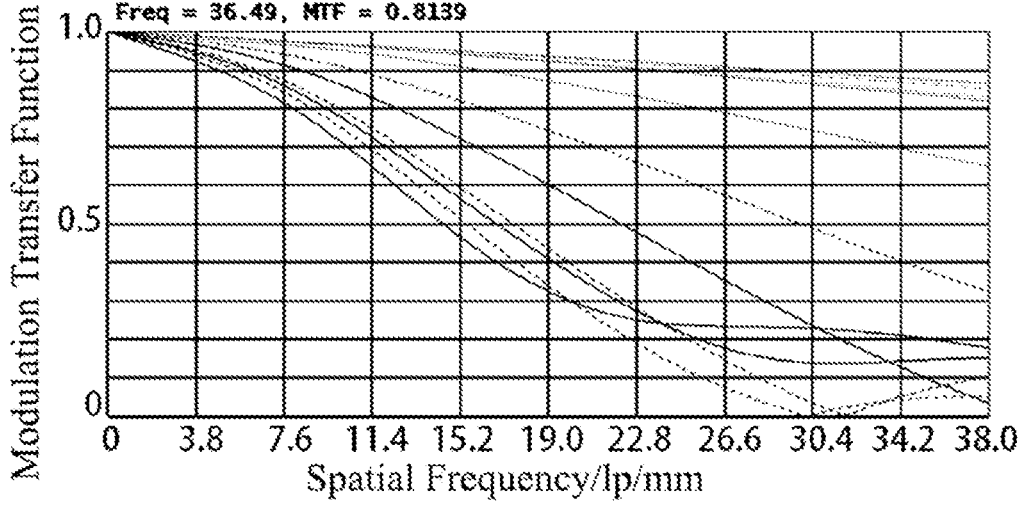
FIG. 13 is an MTF curve diagram of the optical module shown in FIG. 10.

As shown in FIG. 13, in the third embodiment, the MTF at 22 lp/mm is greater than 0.2, causing clear imaging.

Figure 14:
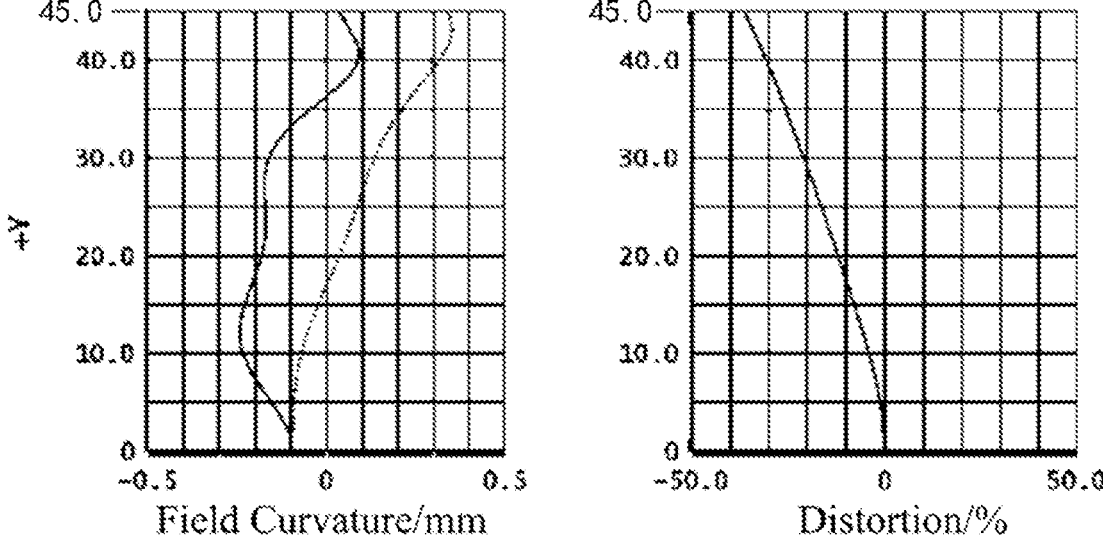
FIG. 14 is a field curvature distortion diagram of the optical module shown in FIG. 10.

In the third embodiment, as shown in FIG. 14, the maximum field curvature distortion occurs near the 1 field of view (maximum field of view), with a maximum value of less than 0.45 mm.

Figure 15:
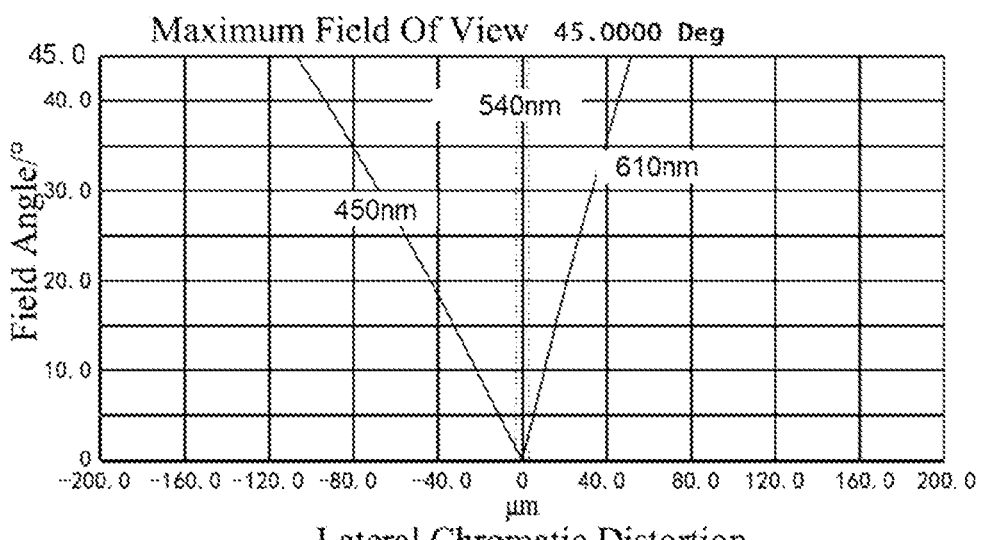
FIG. 15 is a lateral chromatic aberration diagram of the optical module shown in FIG. 10.

In the third embodiment, as shown in FIG. 15, the maximum chromatic dispersion occurs at 1 field of view position, with the maximum chromatic aberration value of the optical module being less than 200 μm.

Fourth Embodiment

Figure 16:
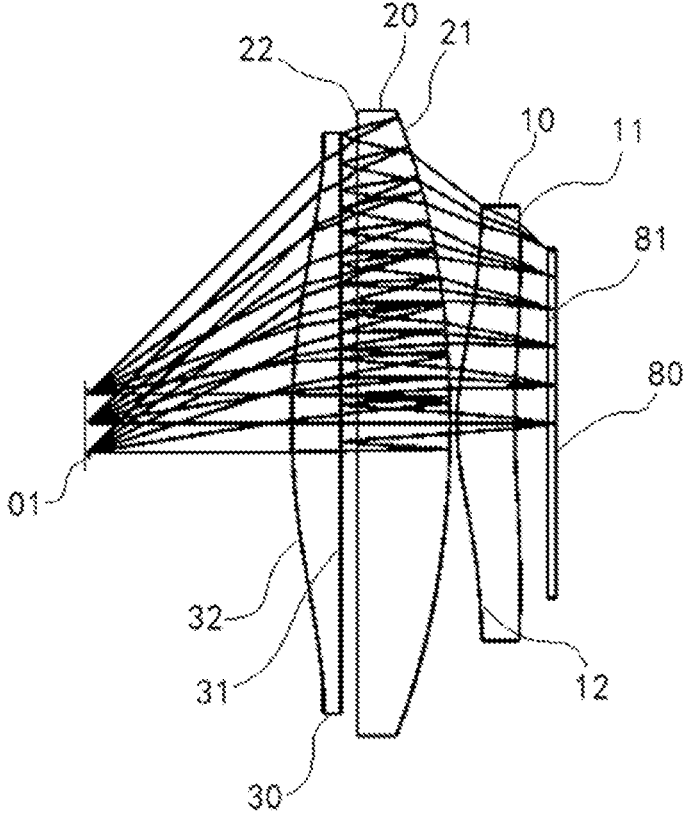
FIG. 16 is a fourth structural schematic diagram of the optical module according to an embodiment of the present disclosure.
Figure 17:
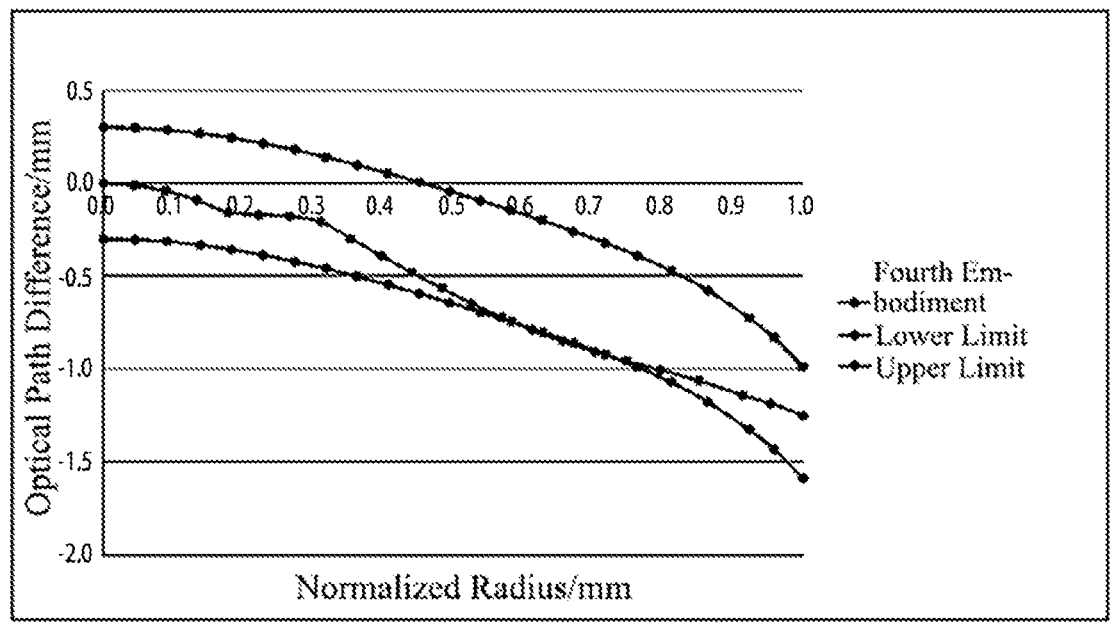
FIG. 17 is a variation diagram of optical path differences between optical paths at different apertures and a central optical path of a first lens in the optical module shown in FIG. 16.

The optical module provided by the embodiment of the present disclosure, as shown in FIG. 16, includes a first lens 10, a second lens 20, and a third lens 30 provided sequentially; the first lens 10 is configured for transmitting incident light; a beam splitter 90 is provided between the second lens 20 and the first lens 10; a first phase retarder 50 and a polarization reflection film 70 are provided on either side of the third lens 30.

Here, the optical path difference between the optical path at 1.0 aperture of the first lens 10 and the central optical path of the first lens 10 is 0.46 times the central optical path; the optical path difference between the optical path at 0.9 aperture of the first lens 10 and the central optical path of the first lens 10 is 0.36 times the central optical path; the optical path difference between the optical path at 0.8 aperture of the

TABLE 4

| surface | radius(mm) | thickness(mm) | material | Conic | A2 | A4 | A6 |
|---|---|---|---|---|---|---|---|
| 32 | 186.3523 | 2.8000 | K26R | 0.0000 | 0.0000 | 2.936E−06 | −1.800E−08 |
| 31 | −107.3630 | 0.5000 | air | 0.0000 | 0.0000 | 1.667E−05 | −4.195E−08 |
| 22 | Infinity | 6.3000 | APEL | 0.0000 | 0.0000 | 0.000E+00 | 0.000E+00 |
| 21 | −49.6807 | 0.5000 | air | 0.0451 | 0.0000 | 2.967E−06 | 1.488E−10 |
| 12 | 39.1560 | 3.4367 | APEL | 0.0000 | 0.0000 | −7.328E−05 | 1.480E−07 |
| 11 | 37.5324 | 2.7188 | air | 0.0000 | 0.0000 | −9.353E−05 | 1.363E−07 |

| surface | A8 | A10 | A12 | A14 | A16 |
|---|---|---|---|---|---|
| 32 | 0.000E+00 | 0.000E+00 | 0.000E+00 | 0.000E+00 | 0.000E+00 |
| 31 | 1.067E−10 | −1.140E−13 | 0.000E+00 | 0.000E+00 | 0.000E+00 |
| 22 | 0.000E+00 | 0.000E+00 | 0.000E+00 | 0.000E+00 | 0.000E+00 |
| 21 | −5.794E−12 | 5.267E−14 | −7.143E−17 | 0.000E+00 | 0.000E+00 |
| 12 | 0.000E+00 | 0.000E+00 | 0.000E+00 | 0.000E+00 | 0.000E+00 |
| 11 | 0.000E+00 | 0.000E+00 | 0.000E+00 | 0.000E+00 | 0.000E+00 |

Figure 12:
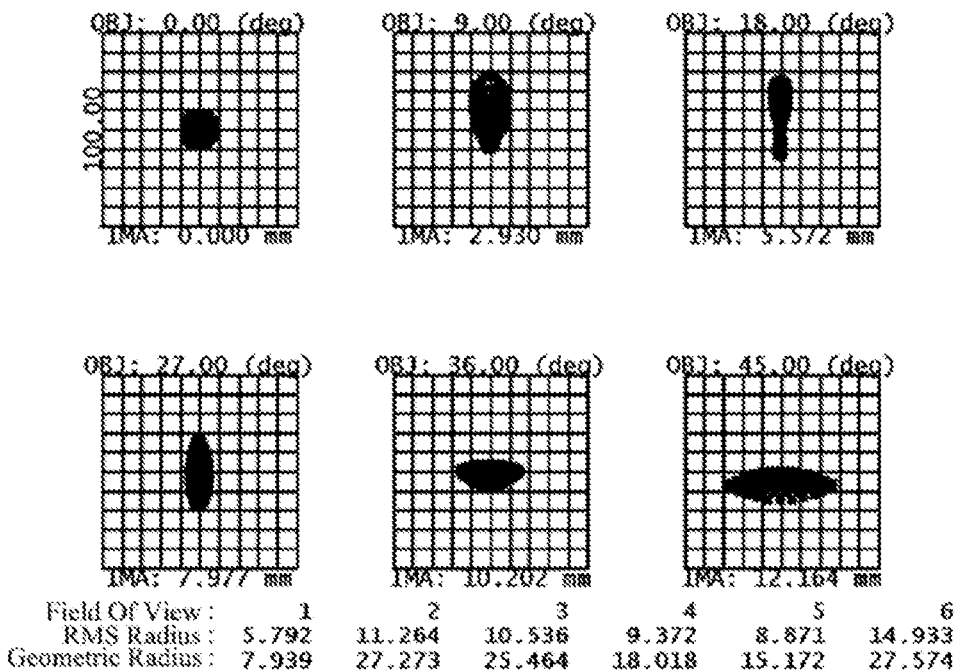
FIG. 12 is a schematic diagram of a point array of the optical module shown in FIG. 10.

For the optical module provided by the third embodiment, as shown in FIGS. 12 to 15: FIG. 12 is a schematic diagram of the point array of the optical module provided by the third embodiment of the present disclosure; FIG. 13 is an MTF graph of the optical module provided by the third embodiment of the present disclosure; FIG. 14 is a field curvature distortion diagram of the optical module provided by the third embodiment of the present disclosure; FIG. 15 is a lateral chromatic distortion diagram of the optical module provided by the third embodiment of the present disclosure; the above table 4 provides the design parameters for the third embodiment.

As shown in FIG. 12, in the third embodiment, the maximum value of the image points in the point array corresponds to the maximum field of view, the maximum value of the image points in the point array is less than 15 μm, the difference between the central field of view and the peripheral field of view is less than 9 μm, and the central first lens 10 and the central optical path of the first lens 10 is 0.23 times the central optical path; the optical path difference between the optical path at 0.7 aperture of the first lens 10 and the central optical path of the first lens 10 is 0.26 times the central optical path; the optical path difference between the optical path at 0.5 aperture of the first lens 10 and the central optical path of the first lens 10 is 0.2 times the central optical path; the optical path difference between the optical path at 0.3 aperture of the first lens 10 and the central optical path of the first lens 10 is 0.02 times the central optical path.

Here, the optical path difference at 1.0 aperture of the first lens 10 is −1.25; the optical path difference at 0.9 aperture is −0.97; the optical path difference at 0.8 aperture is −0.48; the optical path difference at 0.7 aperture is −0.9; the optical path difference at 0.5 aperture is −0.6; the optical path difference at 0.3 aperture is −0.3.

The first lens 10 includes a first surface 11 and a second surface 12; the second lens 20 includes a third surface 21 and a fourth surface 22; the third lens 30 includes a fifth surface 31 and a sixth surface 32.

The above optical module further includes a display 80, which is a small-sized display with a size range of 1 in to 2.1 in.

In the optical module provided by the fourth embodiment of the present disclosure, the optical parameters of the first lens 10, the second lens 20, and the third lens 30 are specifically as shown in Table 5.

TABLE 5

| surface | radius (mm) | thickness(mm) | material | Conic | A2 | A4 | A6 |
|---|---|---|---|---|---|---|---|
| 32 | 53.8381 | 3.8062 | K26R | 0.0000 | 0.0000 | −1.597E−05 | 9.391E−08 |
| 31 | Infinity | 0.5000 | air | 0.0000 | 0.0000 | 0.000E+00 | 0.000E+00 |
| 22 | Infinity | 6.4757 | APEL | 0.0000 | 0.0000 | 0.000E+00 | 0.000E+00 |
| 21 | −58.6810 | 0.5000 | air | 1.2939 | 0.0000 | −1.900E−07 | 1.150E−08 |
| 12 | 1.936E+080 | 3.9000 | APEL | 0.0000 | 0.0000 | −1.564E−05 | −5.812E−08 |
| 11 | 54.7375 | 2.30000 | air | 0.0000 | 0.0000 | −3.543E−04 | 2.096E−06 |

| surface | A8 | A10 | A12 | A14 | A16 |
|---|---|---|---|---|---|
| 32 | −4.346E−10 | 5.487E−13 | 0.000E+00 | 0.000E+00 | 0.000E+00 |
| 31 | 0.000E+00 | 0.000E+00 | 0.000E+00 | 0.000E+00 | 0.000E+00 |
| 22 | 0.000E+00 | 0.000E+00 | 0.000E+00 | 0.000E+00 | 0.000E+00 |
| 21 | −3.045E−11 | 9.568E−15 | 3.428E−17 | 0.000E+00 | 0.000E+00 |
| 12 | 3.166E−10 | 0.000E+00 | 0.000E+00 | 0.000E+00 | 0.000E+00 |
| 11 | −6.243E−09 | 6.939E−12 | 0.000E+00 | 0.000E+00 | 0.000E+00 |

Figure 18:
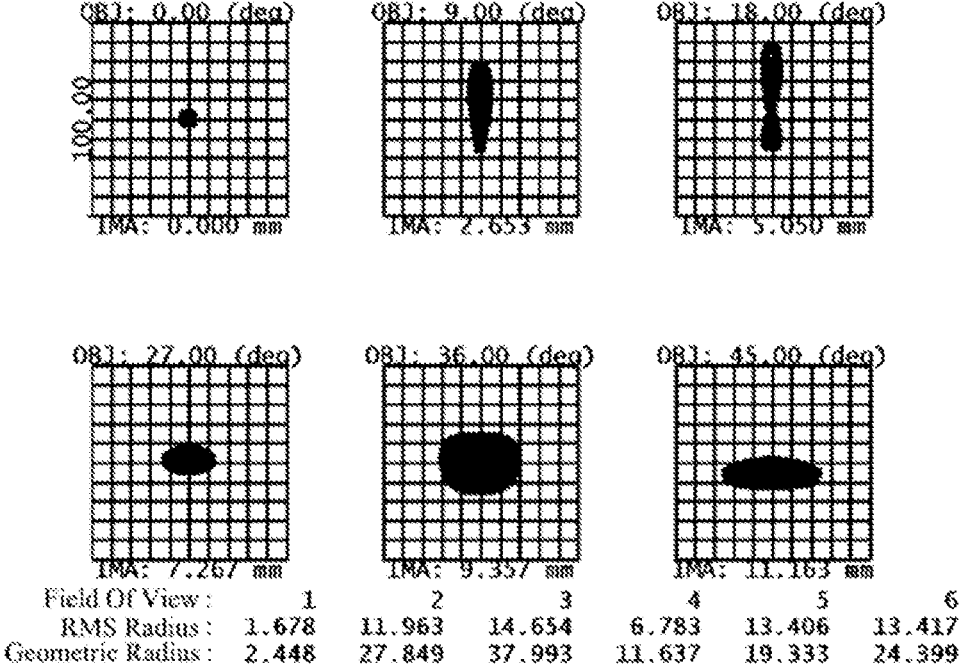
FIG. 18 is a schematic diagram of a point array of the optical module shown in FIG. 16.
Figure 19:
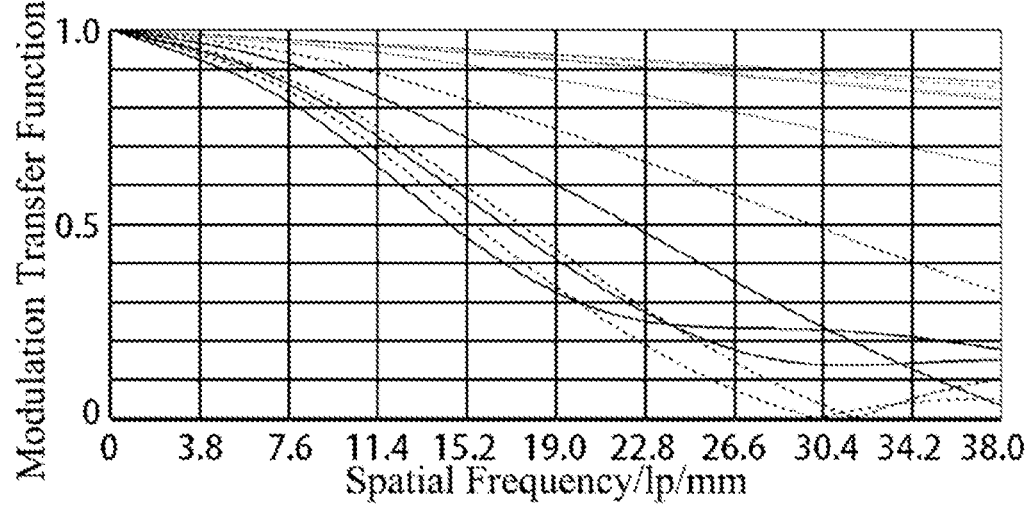
FIG. 19 is an MTF curve diagram of the optical module shown in FIG. 16.
Figure 20:
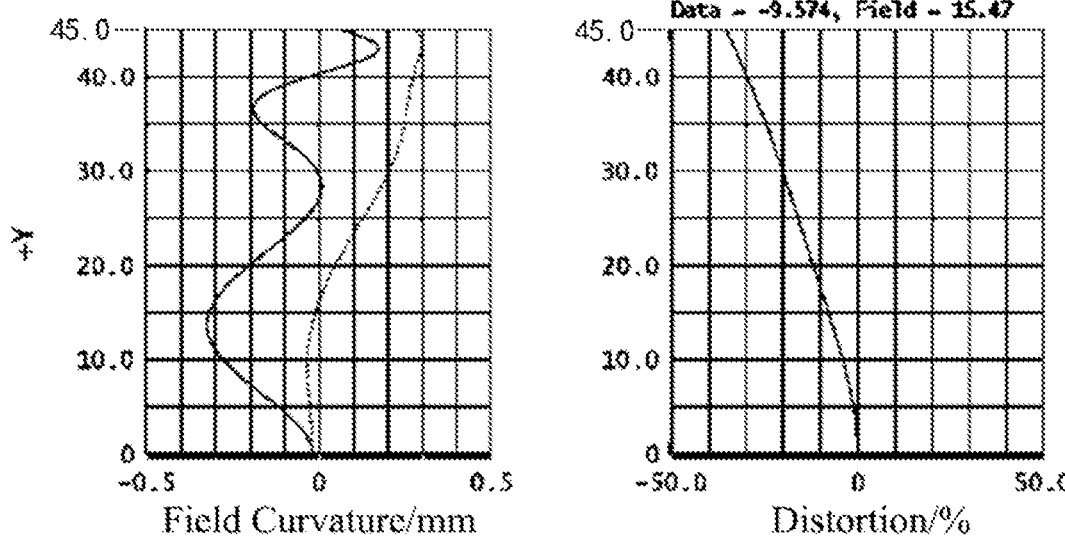
FIG. 20 is a field curvature distortion diagram of the optical module shown in FIG. 16.
Figure 21:
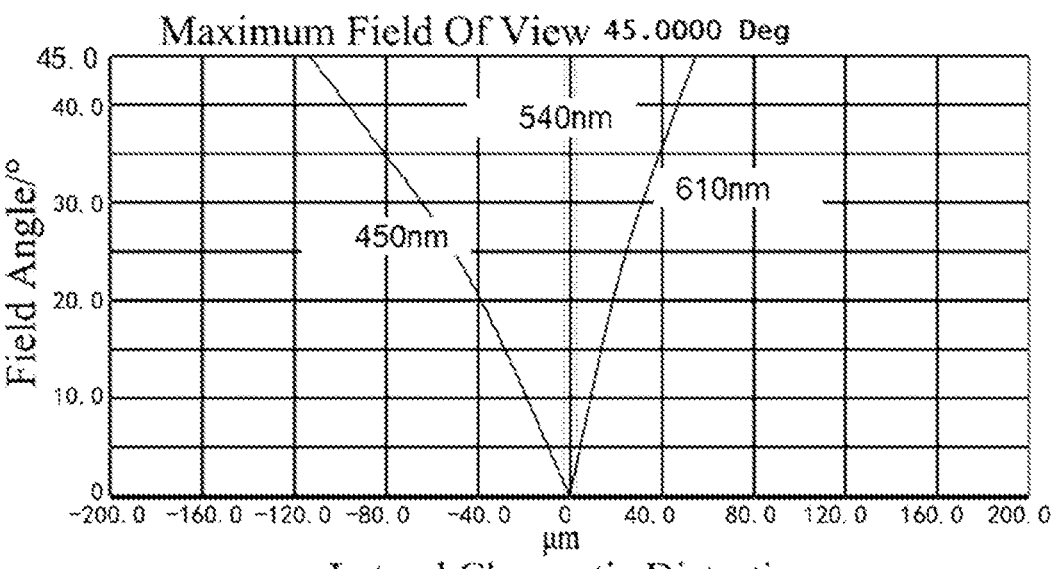
FIG. 21 is a lateral chromatic aberration diagram of the optical module shown in FIG. 16.

For the optical module provided by the fourth embodiment, as shown in FIGS. 18 to 21: FIG. 18 is a schematic diagram of the point array of the optical module provided by the fourth embodiment of the present disclosure; FIG. 19 is an MTF graph of the optical module provided by the fourth embodiment of the present disclosure; FIG. 20 is a field curvature distortion diagram of the optical module provided by the fourth embodiment of the present disclosure; FIG. 21 is a lateral chromatic distortion diagram of the optical module provided by the fourth embodiment of the present disclosure; the above table 5 provides the design parameters for the fourth embodiment.

As shown in FIG. 18, in the fourth embodiment, the maximum value of the image points in the point array corresponds to the maximum field of view, the maximum value of the image points in the point array is less than 14 μm, the difference between the central field of view and the peripheral field of view is less than 12 μm, and the central field of view and the peripheral field of view are simultaneously clearly imaged on the same image plane.

As shown in FIG. 19, in the fourth embodiment, the MTF at 22 lp/mm is greater than 0.2, causing clear imaging.

In the fourth embodiment, as shown in FIG. 20, the maximum field curvature distortion occurs near the 1 field of view (maximum field of view), with a maximum value of less than 0.45 mm.

In the fourth embodiment, as shown in FIG. 21, the maximum chromatic dispersion occurs at 1 field of view position, with the maximum chromatic aberration value of the optical module being less than 200 μm.

According to another aspect of the embodiments of the present disclosure, a head mounted display is further provided, which includes a housing and the optical module described above.

The head mounted display, for example, may be a VR headset, including VR glasses or VR helmets, etc., which is not specifically limited by embodiments of the present disclosure.

The specific implementation of the head mounted display according to the embodiments of the present disclosure may refer to the various embodiments of the display module described above, which will not be repeated herein.

The above embodiments focus on the differences between the various embodiments, and the different optimization features between the various embodiments, as long as they do not contradict each other, may be combined to form a better embodiment, which will not be repeated herein taking into account the brevity of the text.

Although some specific embodiments of the present disclosure have been described in detail through examples, those skilled in the art should understand that the above examples are for illustration only and are not intended to limit the scope of the present disclosure. Those skilled in the art should understand that the above embodiments may be modified without departing from the scope and spirit of the present disclosure.

The invention claimed is:

1. An optical module, comprising:
   a first lens, a second lens, and a third lens provided sequentially,
   a beam splitter, which is provided between the second lens and the first lens, and
   a first phase retarder and a polarization reflection film, provided on a side of the third lens,
   wherein, the first lens is configured for transmitting incident light, and
   an optical path difference between an optical path at a 1.0 aperture of the first lens and a central optical path of the first lens is 0.25~0.5 times of the central optical path.

2. The optical module according to claim 1, wherein the optical path difference between the optical path at the 1.0 aperture of the first lens and the central optical path of the first lens is −1.6 to −1.

3. The optical module according to claim 1, wherein the optical path difference between the optical path at the 1.0 aperture of the first lens and the central optical path of the first lens is −1.58 to −1.2.

4. The optical module according to claim 1, wherein an optical path difference between an optical path at a 0.7 to 0.9 aperture of the first lens and the central optical path of the first lens is −1.5 to −0.05.

5. The optical module according to claim 1, wherein an optical path difference between an optical path at a 0.7 aperture of the first lens and the central optical path of the first lens is −1 to −0.05;

an optical path difference between an optical path at a 0.8 aperture of the first lens and the central optical path of the first lens is −1.2 to −0.3;

an optical path difference between an optical path at a 0.9 aperture of the first lens and the central optical path of the first lens is −1.5 to −0.5.

6. The optical module according to claim 1, wherein central thickness $T_1$ of the first lens is 3 mm<$T_1$<6 mm;

the first lens comprises a first surface and a second surface, both of which are aspherical surfaces.

7. The optical module according to claim 6, wherein the second lens comprises a third surface and a fourth surface, the third surface is adjacent to the second surface and is an aspherical surface, and the fourth surface is a flat surface or an aspherical surface;

the third lens comprises a fifth surface and a sixth surface, both of which are aspherical surfaces, and the fifth surface is adjacent to the fourth surface.

8. The optical module according to claim 7, wherein the first phase retarder and the polarization reflection film are sequentially provided between the fourth surface and the fifth surface.

9. The optical module according to claim 8, wherein the optical module further comprises a polarizing film, which is provided between the fifth surface and the polarization reflection film.

10. The optical module according to claim 9, wherein the polarization reflection film and the polarizing film are stacked to form a film layer structure, which is attached to the fifth surface;

the first phase retarder is attached to the fourth surface.

11. The optical module according to claim 1, wherein the first lens has a focal power $\varphi_1$, which is positive and satisfies: 0<$\varphi_1$<0.01.

12. The optical module according to claim 1, wherein the beam splitter has a reflectivity of 47% to 53%.

13. The optical module according to claim 1, wherein the first lens, the second lens, and the third lens have a refractive index n: 1.4<n<1.7;

the first lens, the second lens, and the third lens have an Abbe number v: 20<v<75.

14. The optical module according to claim 1, wherein the optical module further comprises a display, which is configured for emitting circularly polarized light or linearly polarized light;

when the display is adapted to emit the linearly polarized light, a second phase retarder is provided between the display and the first lens, and is configured for converting the linearly polarized light into circularly polarized light.

15. The optical module according to claim 14, wherein the display has a size of 1 inch to 2.1 inches.

16. A head mounted display, comprising:

a housing; and an optical module according to claim 1.

\* \* \* \* \*